United States Patent
Okishiro et al.

(10) Patent No.: US 7,466,375 B2
(45) Date of Patent: Dec. 16, 2008

(54) LIQUID CRYSTAL DISPLAY DEVICE

(75) Inventors: Kenji Okishiro, Kawasaki (JP);
Masatoshi Shiiki, Musashimurayama (JP)

(73) Assignee: Hitachi Displays, Ltd., Chiba-ken (JP)

( * ) Notice: Subject to any disclaimer, the term of this patent is extended or adjusted under 35 U.S.C. 154(b) by 269 days.

(21) Appl. No.: 11/603,182

(22) Filed: Nov. 22, 2006

(65) Prior Publication Data

US 2007/0121032 A1    May 31, 2007

(30) Foreign Application Priority Data

Nov. 28, 2005    (JP)    ............... 2005-341530

(51) Int. Cl.
*G02F 1/1335*    (2006.01)
*H01J 1/62*    (2006.01)

(52) U.S. Cl. ................ 349/70; 349/56; 349/106; 313/486; 313/503; 252/301.4 P

(58) Field of Classification Search .......... 349/56, 349/70, 71, 106; 313/486, 503; 423/263; 252/301.4 P
See application file for complete search history.

(56) References Cited

U.S. PATENT DOCUMENTS

| | | | |
|---|---|---|---|
| 4,423,349 A | 12/1983 | Nakajima et al. | |
| 5,340,556 A | 8/1994 | Collin et al. | |
| 5,746,944 A | 5/1998 | Braconnier | |
| 6,597,104 B2 * | 7/2003 | Otsuka | 313/486 |

| | | |
|---|---|---|
| 2002/0096990 A1 | 7/2002 | Otsuka |

FOREIGN PATENT DOCUMENTS

| | | |
|---|---|---|
| EP | 1876654 A1 * | 1/2008 |
| JP | 57-023674 | 7/1980 |
| JP | 04-033810 | 5/1990 |
| JP | 05-302082 | 3/1991 |
| JP | 06-056412 | 6/1993 |
| JP | 09-249879 | 3/1996 |
| JP | 2000-109826 | 10/1998 |
| JP | 2002-212553 | 1/2001 |

OTHER PUBLICATIONS

Jean-Claude Bourcet et al., "Quantum Efficiency of Diffusion Limited Energy Transfer in $La_{1-x-y}CE_xTB_yPO_4$", The Journal of Chemical Physics, vol. 60, No. 1, Jan. 1, 1974, pp. 34-39.

* cited by examiner

*Primary Examiner*—Hemang Sanghavi
(74) *Attorney, Agent, or Firm*—Reed Smith LLP; Stanley P. Fisher, Esq.; Juan Carlos A. Marquez, Esq.

(57) ABSTRACT

A liquid crystal display device includes a light source and a liquid crystal display panel. The light source includes a blue-emitting phosphor configured to emit blue light, a green-emitting phosphor configured to emit green light, and a red-emitting phosphor configured to emit red light. The liquid crystal display panel includes color filters configured to control the transmittance of light from the light source and transmit one of blue, green, and red light on a pixel basis. The green-emitting phosphor is represented by a compositional formula of $(La_{1-x-y},Tb_x,Ce_y)PO_4$, wherein "x" and "y" are compositional ratios satisfying both the following conditions: $0.500<(x+y)<0.700$ and $1.20<(y/x)<2.00$. The compositional ratios "x" and "y" preferably satisfy the following conditions: $0.50<(x+y)<0.65$ and $1.50<(y/x)<1.70$.

23 Claims, 13 Drawing Sheets x/y (RATIO OF CERIUM CONTENT TO TERBIUM CONTENT)

DISPLAY-OFF

DISPLAY-ON
TRANSMITTED LIGHT

LIQUID CRYSTAL DISPLAY DEVICE

CLAIM OF PRIORITY

The present application claims priority from Japanese Patent Application No. JP 2005-341530 filed on Nov. 28, 2005, the entire contents of which are hereby incorporated by reference into this application.

BACKGROUND OF THE INVENTION AND RELATED ART STATEMENT

The present invention relates to liquid crystal display devices. More specifically, it relates to liquid crystal display devices each having a back light as a light source, which light source includes a green-emitting phosphor that emits light of high brightness with less variation with temperature.

Liquid crystal display devices generally include a back light unit 1 and a liquid crystal display panel 2, as illustrated in an exploded perspective view in FIG. 8. The back light unit 1 includes a light source 5, drive circuits (inverters) 9 configured to drive the light source 5, a casing 3, a reflector 4, a diffuser plate 6, a prism sheet 7, and a reflective polarizer 8.

The liquid crystal display devices produce color images in the following manner. The back light unit 1 is so configured to guide light emitted from the light source 5 toward the liquid crystal display panel 2. The liquid crystal display panel 2 is so configured to control the transmittance of the guided light on a pixel basis and to split the light into red, green, and blue components and transmit one of red, green, and blue light on a pixel basis.

Cold cathode fluorescent lamps (CCFLs) are generally used as light sources of liquid crystal display devices. FIG. 9 is a sectional view of a cold cathode fluorescent lamp in a longitudinal direction. The cold cathode fluorescent lamp includes a glass tube 11, a phosphor 12 arranged on an inner wall of the glass tube 11, and electrodes 13 arranged at both ends of the glass tube 11. In addition, a discharge medium 14 is enclosed in the glass tube 11. The discharge medium 14 contains, for example, mercury (Hg) and a rare gas such as argon (Ar) or neon (Ne).

A very thin and long shape is a feature of such cold cathode fluorescent lamps generally used as back lights (i.e., light sources) of liquid crystal display devices, which shape differs from those of fluorescent lamps for indoor lighting. Fluorescent lamps for indoor lighting generally have a diameter (inner diameter) of tube of about 30 mm and a length of about 1100 mm. Such a diameter (inner diameter) of tube is simply referred to as "diameter (inner diameter)". In contrast, cold cathode fluorescent lamps generally have a very small diameter (inner diameter) of about 4 mm and a length of about 720 mm in the case of those for 32-inch liquid crystal display devices. Such a very small diameter is a feature of cold cathode fluorescent lamps.

The cold cathode fluorescent lamp illuminates upon the application of a high voltage to the electrodes 13 at both ends. The applied voltage causes electron emission from the electrodes, the emitted electrons excite mercury (Hg), and the excited mercury (Hg) emits ultraviolet rays when it returns to a ground state. The phosphor is excited by the action of the ultraviolet rays to thereby radiate visible rays toward the outside of the cold cathode fluorescent lamp.

The phosphor 12 in the cold cathode fluorescent lamp includes a mixture of powders of a blue-emitting phosphor, a green-emitting phosphor, and a red-emitting phosphor in such proportions to emit light of a predetermined white chromaticity. The blue-emitting phosphor emits blue light having a main emission peak wavelength of about 400 nm to about 500 nm. The green-emitting phosphor emits green light having a main emission peak wave length of about 500 nm to about 600 nm. The red-emitting phosphor emits red light having a main emission peak wavelength of about 600 nm to about 650 nm.

A blue-emitting phosphor $BaMgAl_{10}O_{17}:Eu^{2+}$, a green-emitting phosphor $LaPO_4:Tb^{3+},Ce^{3+}$, and a red-emitting phosphor $Y_2O_3:Eu^{3+}$ are generally used as the blue, green-emitting, and red-emitting phosphors. Such phosphor materials are generally indicated by XX:YY, wherein XX represents the composition of a host material, and YY represents a luminescence center, in which part of atoms constituting the host material is replaced with the luminescence center. For example, the green-emitting phosphor $LaPO_4:Tb^{3+},Ce^{3+}$ includes $LaPO_4$ as a host material, terbium (Tb) as a luminescence center, and cerium (Ce) as an intensifier for intensifying the light emission of terbium (Tb). In this green-emitting phosphor, terbium replaces part of lanthanum (La). Thus, $LaPO_4:Tb^{3+},Ce^{3+}$ may also be indicated as $(La,Tb,Ce)PO_4$.

With reference to FIG. 8, visible rays radiated from the cold cathode fluorescent lamp (light source 5) passes through optical members arranged directly above the cold cathode fluorescent lamp, and come into the liquid crystal display panel 2 facing the back light unit 1. The optical members herein include the diffuser plate 6, the prism sheet 7, and a reflective polarizer 8. The reflector 4 is arranged directly below the cold cathode fluorescent lamp. The reflector 4 is configured to reflect light, and the reflected light also passes through the optical members and comes into the liquid crystal display panel 2.

The liquid crystal display panel 2 has a sectional structure as shown in FIG. 13. Specifically, the liquid crystal display panel 2 includes a pair of glass substrates 21 (21A and 21B), polarizers 22 (22A and 22B), alignment layers 23, a liquid crystal 24, color filters 25, and spacers 26. The pair of glass substrates 21A and 21B face each other. The alignment layers 23 are arranged on inner surfaces of the pair of substrates 21A and 21B, respectively. The color filters 25 include a red filter 25A, a green filter 25B, and a blue filter 25C. The liquid crystal 24 and the color filters 25A, 25B, and 25C are arranged between the pair of substrates 21A and 21B.

A gap between the pair of glass substrates 21 (21A and 21B) is held by the spacers 26. The polarizers 22 (22A and 22B) are arranged outside the pair of substrates 21 (21A and 21B), respectively. The liquid crystal 24 has a uniform alignment by the action of the alignment layers 23 and is driven upon application of a voltage to a group of electrodes (not shown in FIG. 13). The group of electrodes is arranged on a pixel basis. When a voltage is applied, an electric field is formed, the liquid rotates according to the electric field, so as to change the refractive index of the liquid crystal layer. Thus, the transmittance of light is controlled.

The color filters 25 (25A, 25B, and 25C) split white light W from the back light unit 1 into red light R, green light G, and blue light B and transmit any of these light on a pixel basis. Display modes of liquid crystals are classified by the initial alignment of liquid crystal molecules and the drive mode of liquid crystal molecules.

Representative display modes include an in-plane switching (IPS) mode, a vertically aligned (VA) mode, an optically compensated bend (OCB) mode, and a twisted nematic (TN) mode.

The IPS mode and the VA mode are widely employed in current large-screen television sets. According to the IPS mode, liquid crystal molecules are aligned substantially in parallel with the substrate plane and are driven by the action of an electric field substantially in parallel with the substrate plane. In contrast, according to the VA mode, liquid crystal molecules are aligned substantially vertical to a substrate plane and are driven by the action of an electric field substantially vertical to a substrate plane. The two modes can display images with excellent view angle characteristics and are suitable for use in large-screen liquid crystal display devices.

As is described above, liquid crystal display devices produce color displays by allowing a liquid crystal display panel to control, on a pixel basis, the transmittance of light from a light source in a back light unit and allowing color filters to split the light on a pixel basis, which color filters transmit any of red, green, and blue light.

Description on such green-emitting phosphor $LaPO_4$:$Tb^{3+}$,$Ce^{3+}$ can be found, for example, in the following documents.

Japanese Unexamined Patent Application Publication (Laid-Open) No. 57-23674;

Japanese Unexamined Patent Application Publication (Laid-Open) No. 4-338105;

Japanese Unexamined Patent Application Publication (Laid-Open) No. 5-302082;

Japanese Unexamined Patent Application Publication (Laid-Open) No. 6-56412;

Japanese Unexamined Patent Application Publication (Laid-Open) No. 9-249879;

Japanese Unexamined Patent Application Publication (Laid-Open) No. 2000-109826;

Japanese Unexamined Patent Application Publication (Laid-Open) No. 2002-212553; and The Journal of Chemical Physics, Vol. 60, No. 1, p. 34(1974)

OBJECT AND SUMMARY OF THE INVENTION

Liquid crystal display devices expand their market mainly as large-screen liquid crystal television sets. Demands have been made to provide liquid crystal display devices which are available at low cost and produce displays with high image quality. To meet these demands, cold cathode fluorescent lamps as light sources preferably have high brightness and uniformly distributed brightness and chromaticity.

In particular, high brightness of cold cathode fluorescent lamps is an important factor. By satisfying this, liquid crystal display devices may be available at low cost. For example, provided that back light units are configured to emit light of an identical brightness, the number of cold cathode fluorescent lamps can be reduced and the number of invertors can also be reduced if the cold cathode fluorescent lamps have higher brightness. Accordingly, liquid crystal display devices are available at significantly reduced cost. Such cold cathode fluorescent lamps having higher brightness may also save optical members, such as brightness-improving films, to be arranged between cold cathode fluorescent lamps and a liquid crystal display panel. This also contributes to the cost reduction of liquid crystal display devices.

The distributions of brightness and chromaticity of cold cathode fluorescent lamps should be uniformized, because they are factors significantly affecting the image quality of liquid crystal display devices. In liquid crystal display devices, liquid crystal display panels serve to control the transmittance of light from a light source and to split the light into components to thereby display images. A viewer therefore directly sees the light source through the liquid crystal display panel. Accordingly, the distributions of brightness and chromaticity of cold cathode fluorescent lamps as the light source directly affect the image quality of liquid crystal display devices. Particularly, when the light source includes a thin and long tube such as a cold cathode fluorescent lamp, the tube is susceptible to variations (distributions) of brightness and chromaticity in its axial direction (axial direction of tube).

When a back light unit includes plural cold cathode fluorescent lamps, the brightness and/or chromaticity may differ between a cold cathode fluorescent lamp arranged at a center part of the back light unit and those arranged at end parts of the back light unit. In this case, the difference may adversely affect the image quality. It is desirable that light sources have uniformly distributed brightness and chromaticity, particularly when the light sources are used in larger-screen liquid crystal display devices so as to yield higher image quality.

In this connection, the diffuser plate 6 contributes to uniformize the distributions of brightness and chromaticity to some extent. The diffuser plate 6 has a large thickness and is arranged directly above the cold cathode fluorescent lamps. However, the thickness of the diffuser plate 6 can be reduced when the uniformization is achieved by the action of the light source 5 alone. This leads to further cost reduction of liquid crystal display devices.

Under these circumstances, it is desirable to provide a liquid crystal display device which produces images with high quality and is available at low cost. It is also desirable to improve the brightness of a light source typified by a cold cathode fluorescent lamp and to uniformize the distributions of brightness and chromaticity.

In other words, it is desirable to increase the brightness of a light source and to uniformize the distribution of brightness and chromaticity. It is also desirable to provide a high quality liquid crystal display device which produces images with high quality and is available at low cost.

According to an embodiment of the present invention, there is provided a liquid crystal display device which includes a light source and a liquid crystal display panel. The light source includes a blue-emitting phosphor configured to emit blue light, a green-emitting phosphor configured to emit green light, and a red-emitting phosphor configured to emit red light. The liquid crystal display panel includes color filters configured to control the transmittance of light from the light source and to transmit one of blue, green, and red light on a pixel basis. In the liquid crystal display device, the green-emitting phosphor is represented by a compositional formula of $(La_{1-x-y},Tb_x,Ce_y)PO_4$, wherein "x" and "y" are compositional ratios satisfying both the following conditions (1) and (2):

$$0.500 < (x+y) < 0.700 \tag{1}$$

$$1.20 < (y/x) < 2.00 \tag{2}$$

In consideration of radiation characteristics of ultraviolet rays for exciting phosphors and the temperature characteristics of phosphors, the green-emitting phosphor is preferably one represented by a compositional formula of $(La_{1-x-y},Tb_x,Ce_y)PO_4$, wherein "x" and "y" are compositional ratios satisfying both the following conditions (3) and (4):

$$0.500 < (x+y) < 0.650 \tag{3}$$

$$1.50 < (y/x) < 1.70 \tag{4}$$

The light source preferably includes a closed housing, a discharge medium, and electrodes, the closed housing bears the blue-emitting phosphor, the green-emitting phosphor, and the red-emitting phosphor, the discharge medium is enclosed in the closed housing, and the electrodes are configured to apply a voltage to the discharge medium, in which the discharge medium is configured to radiate ultraviolet rays having different wavelengths, and the phosphors are configured to be excited and emit light upon irradiation with the ultraviolet rays having different wavelengths.

The ultraviolet rays having different wavelengths preferably include at least one vacuum ultraviolet ray having a wavelength of less than 200 nm and at least one ultraviolet ray having a wavelength of 200 nm or more.

More specifically, it is preferred that the discharge medium mainly contains mercury (Hg), and the ultraviolet rays having different wavelengths include a vacuum ultraviolet ray having a wavelength of 185 nm and an ultraviolet ray having a wavelength of 254 nm.

The phosphor having the composition may significantly exhibit its activities when the intensity ratio $I_{185}/I_{254}$ of the vacuum ultraviolet ray having a wavelength of 185 nm to the ultraviolet ray having a wavelength of 254 nm is 0.20 or more in the closed housing.

The closed housing is preferably a glass tube, and the glass tube preferably has an inner diameter of 5 mm or less.

The electrodes are preferably arranged at both ends of and inside the glass tube or arranged at both ends of and outside the glass tube.

According to a preferred embodiment, the light source preferably includes a cold cathode fluorescent lamp having an inner diameter of 5 mm or less, and the cold cathode fluorescent lamp preferably includes a discharge medium mainly containing mercury (Hg).

The green-emitting phosphor preferably includes particles having a median particle diameter $d_{50}$ within a range of 3.0 µm to 6.0 µm.

The liquid crystal display panel preferably includes a pair of optically transparent substrates facing each other; alignment layers arranged on or above inner surfaces of the pair of substrates; a liquid crystal layer arranged between the alignment layers; and polarizers arranged outside the pair of substrates, in which the alignment layers are vertically aligned layers, and liquid crystal molecules constituting the liquid crystal are configured to align substantially vertical to a substrate plane upon application of no voltage and to align in a slanting direction to the substrate plane so as to control a light transmittance.

According to an embodiment of the present invention, a light source may have both a high brightness and uniformly distributed brightness and chromaticity. By using the light source, a high-quality liquid crystal display device that produces images with high quality may be provided at lower cost. Such liquid crystal display devices are to have larger and larger screens.

Figure 1A:
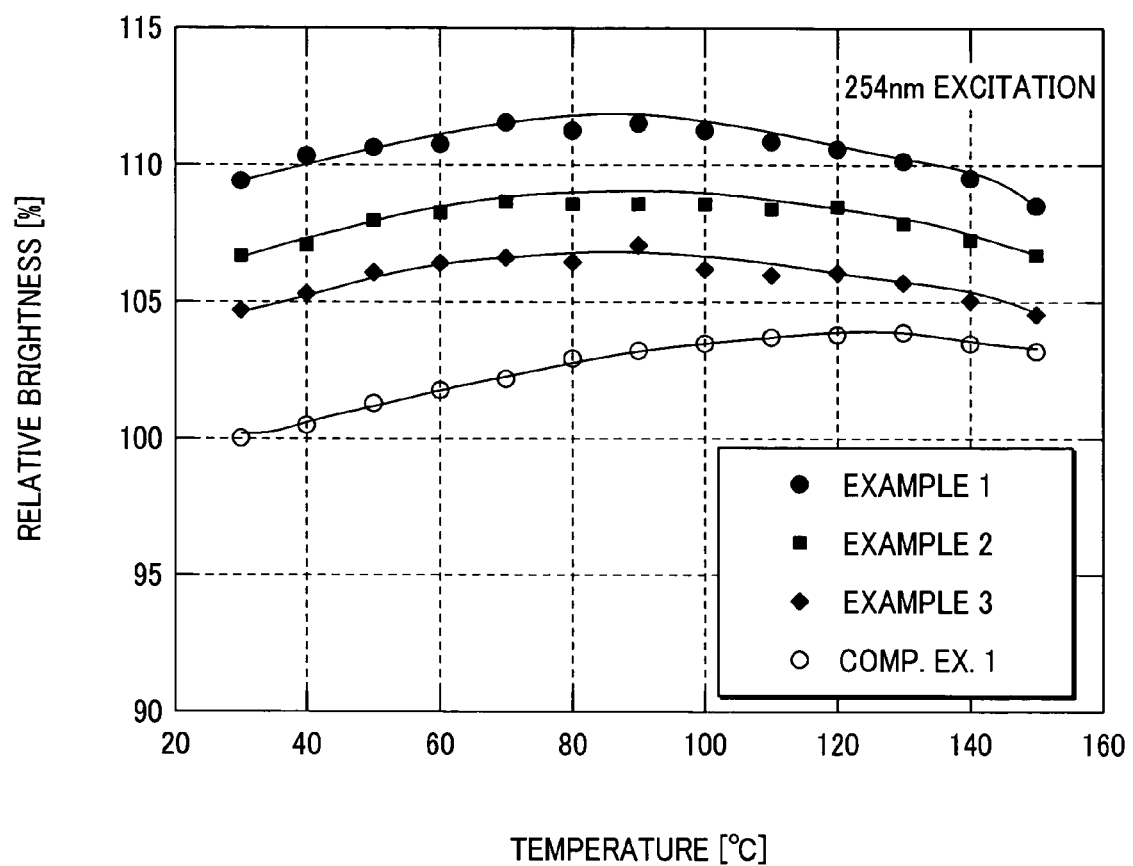
FIG. 1A is a graph showing the temperature characteristics of green-emitting phosphors upon excitation by an ultraviolet ray having a wavelength of 254 nm.

Reference numerals in the drawings are as follows:
1: back light unit, 2: liquid crystal display panel, 3: casing (lower), 4: reflector, 5: light source (e.g., CCFL), 6: diffuser plate, 7: prism sheet, 8: reflective polarizer, 9: inverter, 10: casing (upper), 11: glass tube, 12: phosphor, 13: electrode, 14: discharge medium, 15: closed housing (15A and 15B), 16: division wall, 21 and 31: glass substrate, 22 and 32: polarizer, 23 and 33: alignment layer, 24 and 34: liquid crystal, 25 (25A, 25B, and 25C): color filter (red, green and blue), 26: spacer, 27 and 37: pixel electrode

DETAILED DESCRIPTION OF THE PREFERRED EMBODIMENT

A liquid crystal display device according to an embodiment of the present invention includes a light source and a liquid crystal display panel. The light source includes a blue-emitting phosphor configured to emit blue light, a green-emitting phosphor configured to emit green light, and a red-emitting phosphor configured to emit red light. The blue-emitting phosphor may emit blue light having a main emission peak wavelength of about 400 nm to about 500 nm. The green-emitting phosphor may emit green light having a main emission peak wavelength of about 500 nm to about 600 nm. The red-emitting phosphor may emit red light having a main emission peak wavelength of about 600 nm to about 650 nm. The liquid crystal display panel includes color filters configured to control the transmittance of light from the light source on a pixel basis and to transmit one of blue, green, and red light on a pixel basis. The green-emitting phosphor is represented by a compositional formula of $(La_{1-x-y},Tb_x,Ce_y)PO_4$, wherein "x" and "y" are compositional ratios satisfying both the following conditions (1) and (2):

$$0.500 < (x+y) < 0.700 \quad (1)$$

$$1.20 < (y/x) < 2.00 \quad (2)$$

The compositional ratios "x" and "y" preferably satisfy both the following conditions (3) and (4):

$$0.500 < (x+y) < 0.650 \quad (3)$$

$$1.50 < (y/x) < 1.70 \quad (4)$$

According to an embodiment of the present invention, a green-emitting phosphor represented by $(La_{1-x-y},Tb_x,Ce_y)PO_4$ is used as a green-emitting phosphor in a light source for constituting a back light of a liquid crystal display device, and the compositional ratios "x" and "y" of the green-emitting phosphor satisfy the conditions (1) and (2). The compositional ratios "x" and "y" preferably satisfy both the conditions (3) and (4).

By using the green-emitting phosphor represented by $(La_{1-x-y},Tb_x,Ce_y)PO_4$ having the specific composition, the light source of the resulting liquid crystal display device according to an embodiment of the present invention may have (1) a high brightness and (2) uniformly distributed brightness and chromaticity concurrently. The high brightness (1) and the uniformly distributed brightness and chromaticity (2) are desired in light sources for use in liquid crystal display devices, as is described above.

Figure 5:
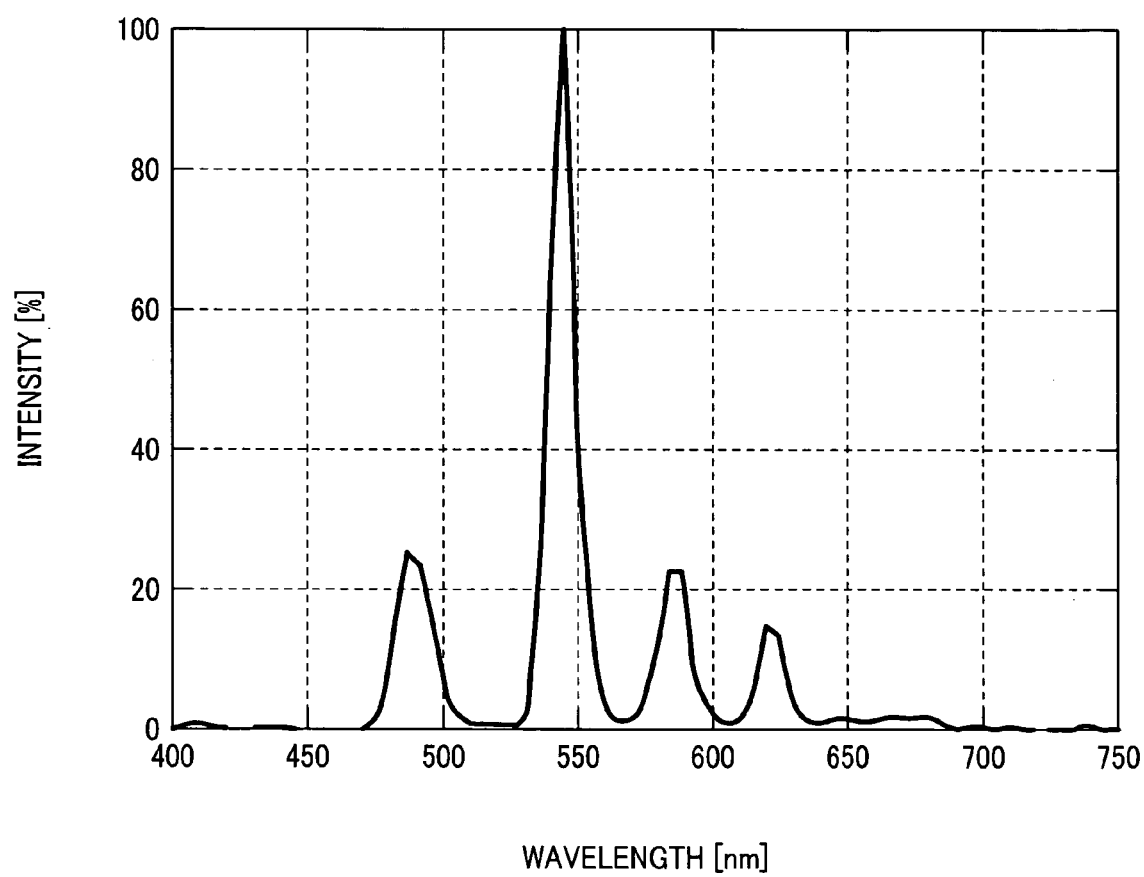
FIG. 5 is a diagram showing the emission spectrum of a green-emitting phosphor.

Such green-emitting phosphors represented by $(La_{1-x-y},Tb_x,Ce_y)PO_4$ have an emission spectrum shown in FIG. 5 and have been used, for example, fluorescent lamps for indoor lighting. A green-emitting phosphor for use in an embodiment of the present invention, however, has a specific composition quite different from those of green-emitting phosphors used in related art. The green-emitting phosphor has such a composition as to provide a light source having both a high brightness and uniformly distributed brightness and chromaticity.

The present inventors have paid attention to the difference in configuration between light sources for liquid crystal display devices and fluorescent lamps for indoor lighting. They have found that green-emitting phosphors having specific compositional ratios "x" and "y" satisfying the conditions (1) and (2) are advantageous in light sources for liquid crystal display devices, and that green-emitting phosphors having specific compositional ratios "x" and "y" satisfying the conditions (3) and (4) are more preferred.

The compositions of phosphors herein refer to basic compositions. Phosphors may further contain trace amounts of impurities. Phosphors are generally synthetically prepared using fluxes and the resulting phosphors may contain constitutional elements of fluxes as trace impurities. For example, a green-emitting phosphor represented by $(La_{1-x-y},Tb_x,Ce_y)PO_4$ may be prepared using lithium tetraborate $Li_2B_4O_7$ as a flux. In this case, the resulting phosphor may contain a trace amount of lithium (Li).

In addition, when phosphors are fired, they come in contact with a firing vessel such as an alumina crucible, and the fired phosphors may contain trace amounts of elements constituting the firing vessel. Phosphors for use in an embodiment of the present invention may contain trace amounts of impurities within ranges not adversely affecting optical properties of the phosphors.

Phosphors having specific compositions are effective for (1) high brightness and (2) uniformly distributed brightness and chromaticity of light sources in liquid crystal display devices. The reasons will be described below.

(1) High Brightness

Cold cathode fluorescent lamps for use in liquid crystal display devices each have a very small diameter and have shapes (dimensions) significantly different from those of fluorescent lamps for indoor lighting. For example, fluorescent lamps for regular domestic lighting each have a diameter (inner diameter) of about 30 mm. In contrast, cold cathode fluorescent lamps each have a very small diameter of, for example, about 4 mm. The present inventors paid attention to the difference in diameter of tube, which difference may affect the radiation characteristics of ultraviolet rays radiated in lamps. They have found preferred compositions of green-emitting phosphors represented by $(La_{1-x-y},Tb_x,Ce_y)PO_4$, and that the resulting green-emitting phosphors are suitable for the radiation characteristics of ultraviolet rays to be generated in cold cathode fluorescent lamps.

Cold cathode fluorescent lamps and fluorescent lamps for lighting are classified by the light source as mercury lamps. In these lamps, mercury is enclosed as a discharge medium in a glass tube, the glass tube bears a phosphor inside, and mercury radiates ultraviolet rays which allow the phosphor to emit light.

Ultraviolet rays radiated from mercury include ultraviolet rays having different wavelengths. They include ultraviolet rays having wavelengths of, for example, 365 nm, 313 nm, 298 nm, and 254 nm, and they further include a vacuum ultraviolet ray having a wave length of 185 nm. The term "vacuum ultraviolet ray" refers to a ray having a wavelength of less than 200 nm. The radiation ratio (intensity) of these ultraviolet rays varies significantly depending on the diameter (inner diameter) of the glass tube and temperature. The ratio of radiated rays largely differs between cold cathode fluorescent lamps and regular fluorescent lamps for indoor lighting. The emission characteristics of phosphors vary depending on the radiation properties of ultraviolet rays as an excitation source. Accordingly, an optimum composition of a phosphor varies depending on the radiation ratio of ultraviolet rays. The present inventors have focused attention to this point.

In glass tubes having relatively large diameters as in fluorescent lamps for indoor lighting, mercury mainly radiates an ultraviolet ray having a wavelength of 254 nm and radiates substantially no other ultraviolet rays. Accordingly, phosphors in fluorescent lamps for indoor lighting are mainly excited by the ultraviolet ray having a wavelength of 254 nm.

In contrast, mercury radiates a vacuum ultraviolet ray having a wavelength of 185 nm at an increased radiation ratio, in addition to an ultraviolet ray having a wavelength of 254 nm in glass tubes having relatively small diameters. The present inventors have found that the radiation ratio $I_{185}/I_{254}$ of a vacuum ultraviolet ray having a wavelength of 185 nm to an ultraviolet ray having a wavelength of 254 nm is 0.20 or more in glass tubes having very small diameters of about 5 mm or less, as in cold cathode fluorescent lamps. They have also found that the radiation ratio also varies depending on the temperatures of tubes. For example, the radiation ratio $I_{185}/I_{254}$ may be 0.50 or more at elevated temperatures as in the case where a cold cathode fluorescent lamp illuminates in a back light unit.

Consequently, the present inventors have focused attention to a vacuum ultraviolet ray having a wavelength of 185 nm which is radiated at a high ratio in cold cathode fluorescent lamps. They made investigations on such compositions of green-emitting phosphors $(La_{1-x-y},Tb_x,Ce_y)PO_4$ as to yield both satisfactory emission characteristics of phosphors upon excitation by an ultraviolet ray having a wavelength of 254 nm and satisfactory emission characteristics of phosphors upon excitation by a vacuum ultraviolet ray having a wavelength of 185 nm. As a result, they have found that the compositional ratios of green-emitting phosphors $(La_{1-x-y},Tb_x,Ce_y)PO_4$ satisfying the conditions (1) and (2) are suitable for high brightness of light sources for use in liquid crystal display devices. They have further found that the compositional ratios satisfying the conditions (3) and (4) are more preferred. Such preferred compositions of green-emitting phosphors $(La_{1-x-y},Tb_x,Ce_y)PO_4$ will be illustrated in detail below.

A green-emitting phosphor represented by $(La_{1-x-y},Tb_x,Ce_y)PO_4$ contains terbium (Tb) as a luminescence center and shows an emission spectrum shown in FIG. 5 as a result of light emission from terbium (Tb). The light emission process varies depending on the wavelength of an excitation ultraviolet ray. Cerium (Ce) absorbs ultraviolet rays having wavelengths of 220 nm to 300 nm, and the excited cerium transfers energy to terbium (Tb) to allow terbium to emit light.

In contrast, terbium directly absorbs vacuum ultraviolet rays having wavelengths of 160 nm to 200 nm and thereby emits light. These mechanisms can be described, for example, in The Journal of Chemical Physics, Vol. 60, No. 1, p. 34(1974). When a green-emitting phosphor represented by $(La_{1-x-y},Tb_x,Ce_y)PO_4$ is applied to a cold cathode fluorescent lamp, the green-emitting phosphor preferably acts to convert the two different ultraviolet rays into visible rays. The two different ultraviolet rays are radiated in a glass tube and include a vacuum ultraviolet ray having a wavelength of 185 nm and an ultraviolet ray having a wavelength of 254 nm. Accordingly, it is desirable to set suitable compositional ratios of cerium and terbium. In particular, the total content "x+y" of cerium and terbium and the ratio "y/x" of the cerium content to the terbium content may affect the conversion efficiency of rays.

The present inventors therefore made examinations on brightness of green-emitting phosphors $(La_{1-x-y},Tb_x,Ce_y)PO_4$ having different compositional ratios upon excitation by a vacuum ultraviolet ray and excitation by an ultraviolet ray having a wavelength of 254 nm. The results are shown in graphs in FIGS. 2 and 3. In these graphs, brightness is indicated by a relative brightness whereas the brightness of a widely used green-emitting phosphor $(La_{1-x-y},Tb_x,Ce_y)PO_4$, wherein "x+y" is 0.428 and "y/x" is 2.18, upon respective excitations is set at 100%. In these figures, "VACUUM ULTRAVIOLET RAY EXCITATION" represents the excitation by a vacuum ultraviolet ray (hereinafter briefly referred to as "VUV excitation").

A xenon excimer light source having a wavelength of 172 nm, near to 185 nm, was used in the examination (evaluation) upon VUV excitation, although such an evaluation should be carried out using a vacuum ultraviolet ray having a wavelength of 185 nm. This is because there is no light source which radiates a vacuum ultraviolet ray having a single wavelength of 185 nm. There is no harm in taking emission characteristics of phosphors upon excitation at a wavelength of 172 nm herein. The two rays are both vacuum ultraviolet rays and show an identical absorption band in phosphors, although they have different wavelengths.

Figure 2:
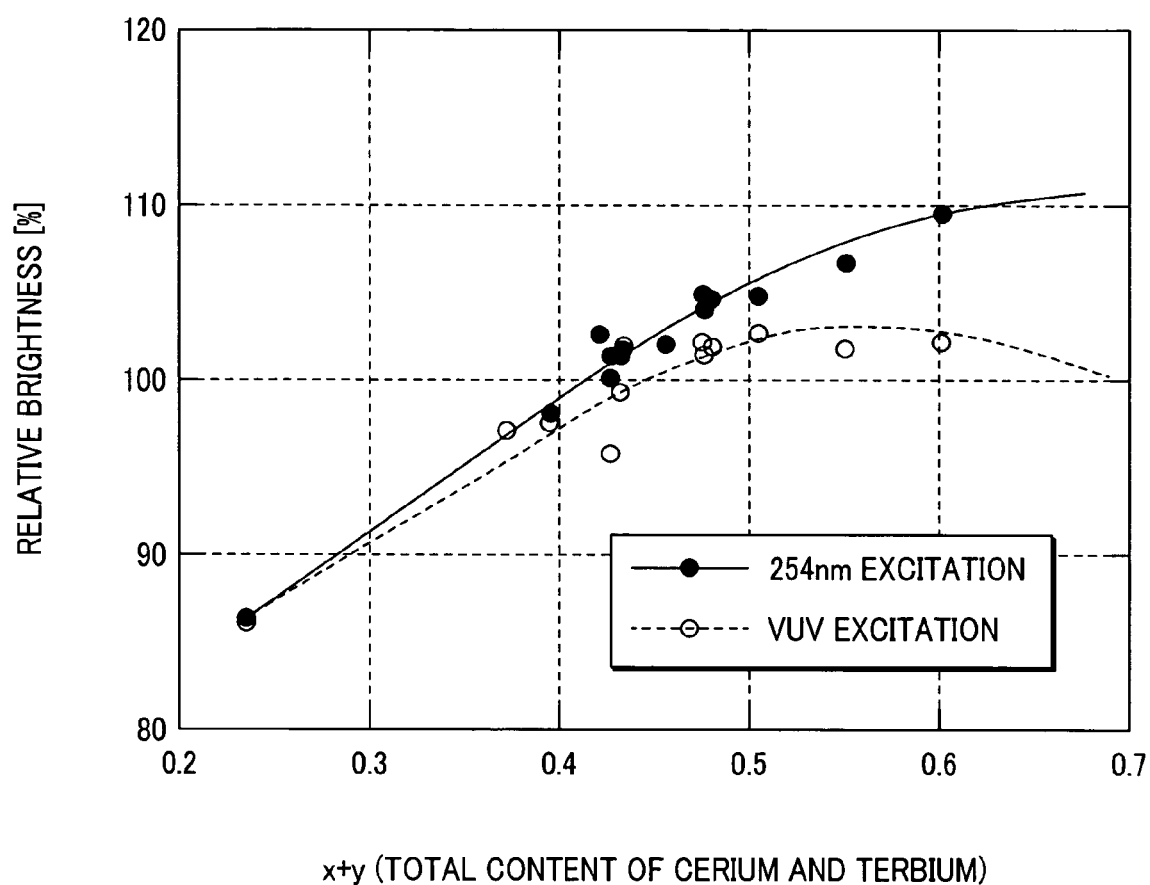
FIG. 2 is a graph showing the relationship between the relative brightness and the total content "x+y" of cerium and terbium in green-emitting phosphors.

FIG. 2 demonstrates that the relative brightness upon respective excitations largely varies depending on the total content "x+y" of cerium and terbium. Upon excitation by an ultraviolet ray having a wavelength of 254 nm (hereinafter briefly referred to as "excitation at 254 nm"), the relative brightness increases with an increasing total content "x+y" and it exceeds 100% at a total content "x+y" of 0.42 or more.

In contrast, the relative brightness varies substantially in a convex parabola and is high at a total content "x+y" of 0.45 to 0.70 upon VUV excitation. A cold cathode fluorescent lamp shows an emission characteristic as a total sum of the emission characteristic upon excitation at 254 nm and that upon VUV excitation in specific proportions. Accordingly, the total content "x+y" is preferably within a range of 0.50 to 0.70 in consideration of the total of the relative brightness upon excitation at 254 nm and the relative brightness upon VUV excitation. The total content "x+y" may be increased up to 0.70, because the relative brightness upon VUV excitation decreases, but the relative brightness upon excitation at 254 nm is very high at total contents "x+y" of about 0.65 or more. The total content "x+y" is more preferably within a range of 0.50 to 0.65, because the relative brightness upon VUV excitation and that upon excitation at 254 nm are both as high as 102% or more within this range. Such a high relative brightness of 102% or more can be visually recognized as an effectively high brightness.

Figure 3:
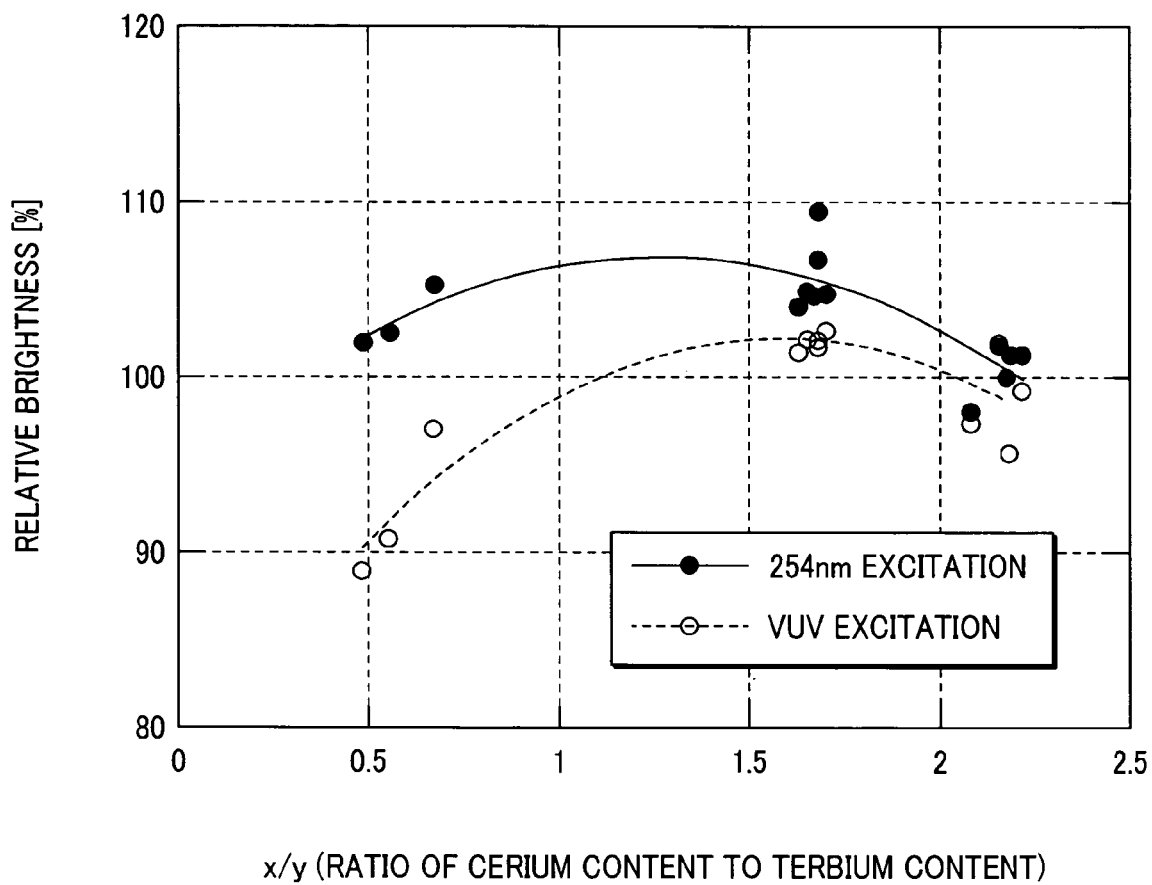
FIG. 3 is a graph showing the relationship between the relative brightness and the ratio "y/x" of the cerium content to the terbium content in green-emitting phosphors.

Next, the relationship between the ratio "y/x" of the cerium content to the terbium content (hereinafter briefly referred to as ratio "y/x") and the relative brightness was investigated upon green-emitting phosphors represented by $(La_{1-x-y},Tb_x,Ce_y)PO_4$ having such compositions that are expected to show high brightness. The results are shown in FIG. 3. FIG. 3 demonstrates that the relative brightness upon respective excitations largely varies depending on the ratio "y/x". The relative brightness varies substantially in a convex parabola with an increasing ratio "y/x" upon excitations. The ratio "y/x" is preferably within a range of 1.20 to 2.00 in consideration of the total of the relative brightness upon excitation at 254 nm and the relative brightness upon VUV excitation. The ratio "y/x" is more preferably within a range of 1.50 to 1.70, because the relative brightness upon VUV excitation and that upon excitation at 254 nm are both as high as 102% or more within this range. Such a high relative brightness of 102% or more can be visually recognized as an effectively high brightness.

For high brightness, therefore, the compositional ratios "x" and "y" preferably satisfy both the conditions: $0.500<(x+y)<0.650$ and $1.20<(y/x)<2.00$. They more preferably satisfy both the conditions: $0.500<(x+y)<0.700$ and $1.50<(y/x)<1.70$.

(2) Uniform Distributions of Brightness and Chromaticity

It is also desirable to uniformize the distributions of brightness and chromaticity in light sources. Of such light sources, cold cathode fluorescent lamps may have a brightness and chromaticity distributed in an axial direction of tube, and such distributions (unevenness) affect the quality of images produced by liquid crystal display devices. In liquid crystal display devices, a liquid crystal display panel serves to control the transmittance of light from a light source and to split the light into components to thereby display images. A viewer therefore sees the light source through the liquid crystal display panel. Accordingly, the distributions of brightness and chromaticity of cold cathode fluorescent lamps as the light source directly affect the image quality of liquid crystal display devices. In contrast, such distributions of brightness and chromaticity may not always significantly affect the image quality in fluorescent lamps for lighting. Specifically, a viewer does not substantially directly see light from fluorescent lamps for lighting but sees reflected light, in which the light from fluorescent lamps for lighting is reflected by an object and is seen by the viewer. Accordingly, the distributions of brightness and chromaticity of the fluorescent lamps for lighting do not substantially affect the quality of lighting.

The present inventors have focused attention to the distributions (unevenness) of brightness and chromaticity in light sources for liquid crystal display devices, because these parameters may significantly affect the image quality. Accordingly, they have found that it is desirable to uniformize the distributions of brightness and chromaticity in cold cathode fluorescent lamps. In contrast, such distributions of brightness and chromaticity are trivial in fluorescent lamps for lighting.

Figure 6:
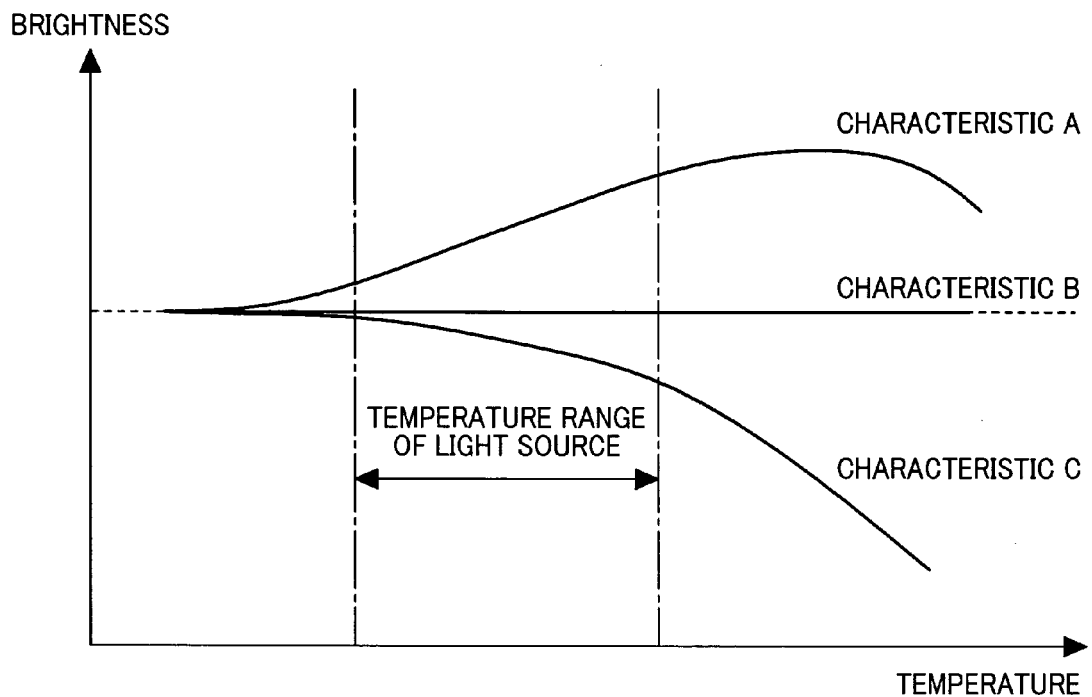
FIG. 6 schematically illustrates the temperature characteristics of phosphors.

The present inventors have focused attention to the temperature characteristic of a phosphor in cold cathode fluorescent lamps, as a factor to cause the distributions of brightness and chromaticity. The "temperature characteristic" herein refers to a phenomenon in which, when an excitation ray at an identical intensity is applied to a phosphor, the phosphor shows an emission efficiency which varies depending on the temperature. FIG. 6 schematically illustrates temperature characteristics of phosphors. When a phosphor has a poor temperature characteristic, the phosphor shows a largely varying emission efficiency (brightness) depending on the temperature (corresponding to Characteristic A and Characteristic C in FIG. 6). In other words, the brightness in this case varies at a high rate (with a large slope) depending on the temperature. In contrast, when a phosphor has a good temperature characteristic, the phosphor shows a less varying emission efficiency (brightness) depending on the temperature (corresponding to Characteristic B in FIG. 6). In other words, the brightness in this case varies at a low rate (with a small slope) depending on the temperature.

Figure 7:
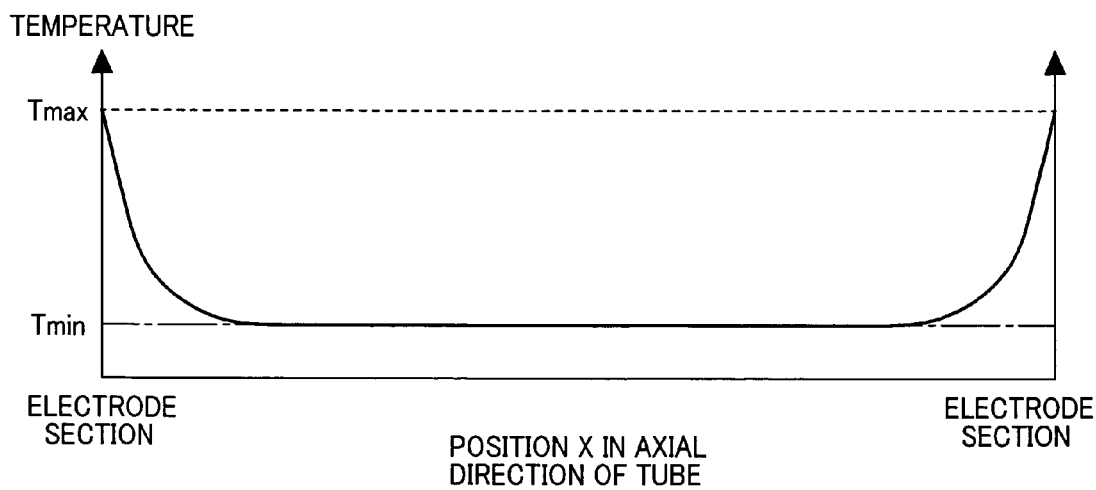
FIG. 7 schematically illustrates the temperature distribution in an axial direction of a cold cathode fluorescent lamp.

Cold cathode fluorescent lamps generally undergo highly elevated temperatures, because a high voltage with a high frequency (e.g., up to 50 kHz at 1 kV) is applied to electrodes arranged at both ends of the tube, and heat is generated due to energy loss. In cold cathode fluorescent lamps, the electrodes generate heat, and the temperature therein is highest at the electrodes and decreases toward a center part of the tube. The temperature inside the tube generally has a distribution as shown in FIG. 7, while it varies depending on the length of a cold cathode fluorescent lamp as the tube and on how the cold cathode fluorescent lamp is mounted to a back light unit. The distribution of temperature and the temperature characteristic of a phosphor cause the distributions of brightness and chromaticity. When a cold cathode fluorescent lamp uses a green phosphor having Characteristic A in FIG. 6, for example, the cold cathode fluorescent lamp shows a high brightness in the vicinity of electrodes in which the temperature is high. In contrast, the cold cathode fluorescent lamp shows a low brightness in portions at low temperatures. In addition, a generally used cold cathode fluorescent lamp uses a mixture of three-color (red, green, and blue) phosphors so as to yield a specific whiteness. The resulting cold cathode fluorescent lamp shows a high brightness of the green-emitting phosphor and thereby shows a white color including a large portion of a green component in the vicinities of electrodes at elevated temperatures. In contrast, it shows a low brightness of the green phosphor and shows a white color including a small portion of a green component in portions at low temperatures.

When a cold cathode fluorescent lamp is arranged in a back light unit, the cold cathode fluorescent lamp may undergo distributions of brightness and chromaticity due to the temperature distribution in the back light unit. In particular, the temperature may rise in an upper portion of the unit due typically to the convention of a gas in the unit. Accordingly, it is desirable to adjust or control the temperature characteristic of a phosphor. Specifically, it is desirable to provide a phosphor showing a brightness less varying at such temperatures as in the light source.

The temperature characteristic of a phosphor is affected by the composition of the phosphor. In particular, cerium contained in a green-emitting phosphor $(La_{1-x-y},Tb_x,Ce_y)PO_4$ is a factor significantly affecting the temperature characteristic. It is generally believed that the temperature characteristic deteriorates with an increasing cerium content. Accordingly, the temperature characteristic may deteriorate with an increasing cerium content, even when the total content "x+y" of cerium and terbium and the ratio "y/x" of the cerium content to the terbium content are adjusted in order to increase the brightness. The present inventors therefore made investigations on the temperature characteristics of green-emitting phosphors $(La_{1-x-y},Tb_x,Ce_y)PO_4$ having different compositional ratios "x" and "y" within such a composition range as to yield a high brightness. The temperature characteristics were investigated upon VUV excitation and ultraviolet ray excitation, because the temperature characteristics also vary depending on the wavelength of an excitation source.

Figure 4:
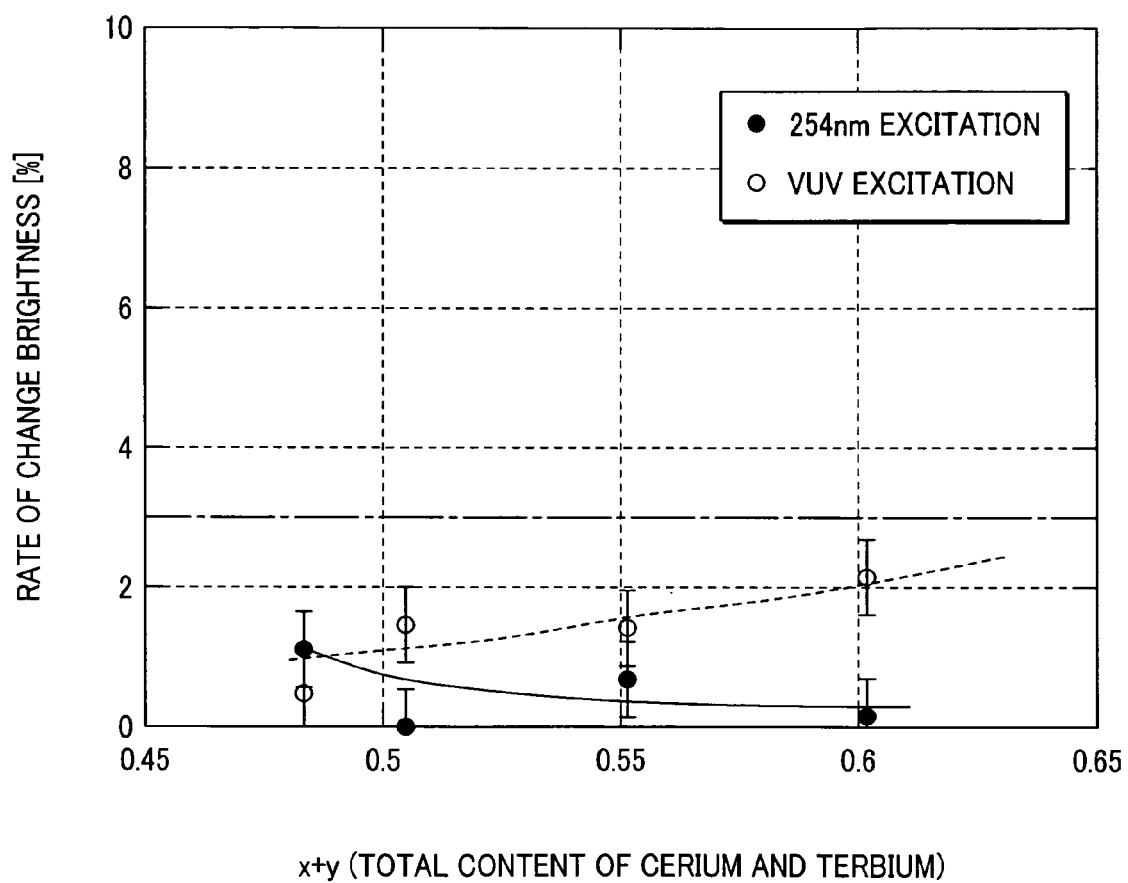
FIG. 4 is a graph showing the relationship between the rate of change of brightness and the total content "x+y" of cerium and terbium in green-emitting phosphors.

FIG. 4 shows the determined temperature characteristics, with the abscissa indicating the total content of cerium and terbium "x+y", and the ordinate indicating the rate of change of brightness. The rate of change of brightness herein is determined by calculation from the rate of change of brightness per unit within a temperature range of 50° C. to 120° C. This temperature range is set in consideration of the possible temperatures in cold cathode fluorescent lamps. Preceding investigations demonstrate that the liquid crystal display device may produce visually acceptable images at a rate of change of brightness of 3% or less as indicated by dashed lines in FIG. 4. FIG. 4 demonstrates that the temperature characteristic presents no visual problem within the above-specified range of composition. However, it also demonstrates that the rate of change of brightness increases with an increasing total content "x+y" upon VUV excitation. A visual problem may be invited at a composition exceeding the above-specified range.

Consequently, the composition ratios "x" and "y" of a green-emitting phosphor for use as a light source of cold cathode fluorescent lamp preferably satisfy both the conditions: $0.500<(x+y)<0.650$ and $1.20<(y/x)<2.00$. They are preferably satisfy both the conditions: $0.500<(x+y)<0.700$ and $1.50<(y/x)<1.70$. By satisfying these, the resulting cold cathode fluorescent lamp may have both high brightness and uniformly distributed brightness and chromaticity as a light source for liquid crystal display devices.

Phosphors for use in an embodiment of the present invention preferably include particle shaving a median particle diameter $d_{50}$ within a range of 3.0 µm to 6.0 µm. Sufficient optical properties may not be effectively exhibited in phosphors having a median particle diameter $d_{50}$ less than or larger than the above-specified range. The "median particle diameter $d_{50}$" herein refers to a particle diameter at which the integrated mass of particles occupies 50% of the total mass of particles in a particle size distribution of particles constituting a phosphor.

Such phosphors as mentioned above are preferably used in light sources for liquid crystal display devices. Next, light sources of liquid crystal display devices will be illustrated below. Cold cathode fluorescent lamps are currently the mainstream as the light sources, but a variety of other light sources have been proposed. A green-emitting phosphor represented by $(La_{1-x-y},Tb_x,Ce_y)PO_4$ having the specific composition proposed according to an embodiment of the present invention is advantageously used in these light sources so as to yield a high brightness and uniformly distributed brightness and chromaticity. The efficacy of the phosphor in these light sources will be described with reference to the structures and properties of the light sources. The light sources include cold cathode fluorescent lamps (CCFLs), hot cathode fluorescent lamps (HCFLs), external electrode fluorescent lamps (EEFLs), and flat light sources.

Cold Cathode Fluorescent Lamp (CCFL)

Figure 9:
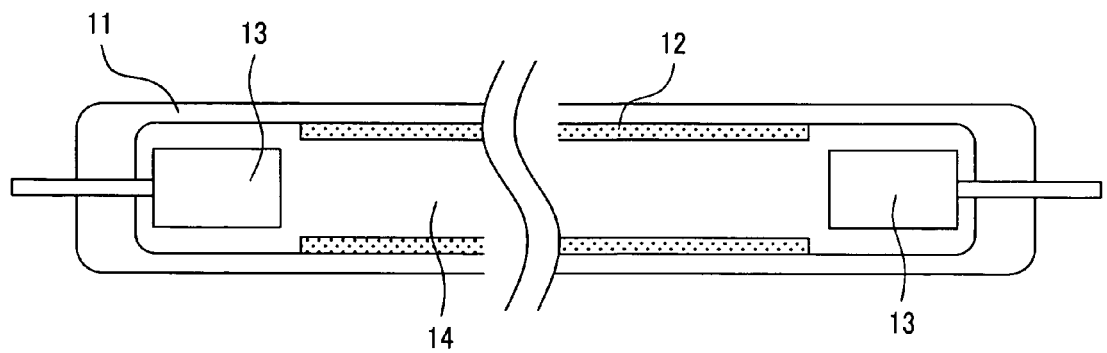
FIG. 9 schematically illustrates a sectional structure of a cold cathode fluorescent lamp (CCFL)

A cold cathode fluorescent lamp has a structure schematically illustrated in FIG. 9. Specifically, the cold cathode fluorescent lamp includes a glass tube 11, a phosphor 12, electrodes 13, and a discharge medium 14. The phosphor 12 is arranged on an inside wall of the glass tube 11. The discharge medium 14 is encapsulated in the glass tube 11. The electrodes 13 are arranged at both ends of and inside the glass tube 11. The discharge medium 14 mainly contains mercury and further contains a rare gas such as argon or neon.

Such a cold cathode fluorescent lamp has a very small diameter of about 3 to about 5 mm, in which mercury radiates a vacuum ultraviolet ray having a wave length of 185 nm in addition to an ultraviolet ray having a wave length of 254 nm. The emission characteristic of a phosphor is therefore significantly affected by the excitation by the vacuum ultraviolet ray. Accordingly, a green-emitting phosphor having the above-specified composition is advantageously used in cold cathode fluorescent lamps so as to yield both a satisfactory brightness upon VUV excitation and a satisfactory brightness upon excitation by an ultraviolet ray having a wavelength of 254 nm.

Hot Cathode Fluorescent Lamp (HCFL)

Figure 10:
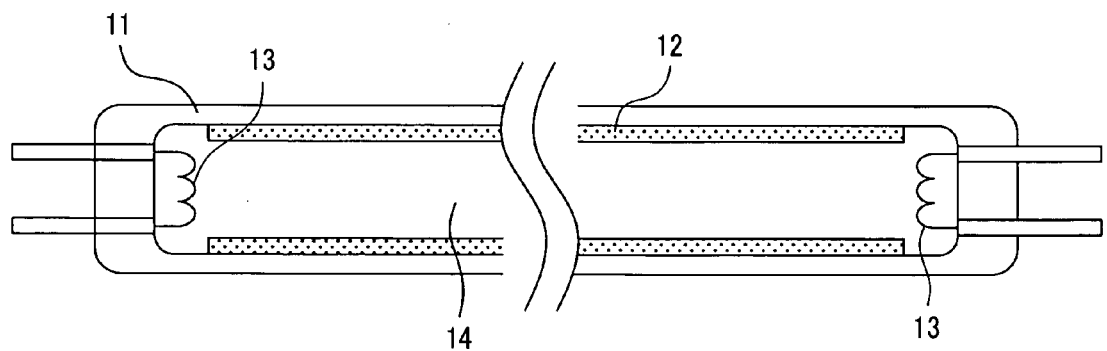
FIG. 10 schematically illustrates a sectional structure of a hot cathode fluorescent lamp (HCFL)

Hot cathode fluorescent lamps (HCFLs) may also be used as light sources instead of cold cathode fluorescent lamps. In this case, the green-emitting phosphor $(La_{1-x-y},Tb_x,Ce_y)PO_4$ having the specific composition can also be used. A hot cathode fluorescent lamp has a structure schematically illustrated in FIG. 10. The structure is similar to that of a cold cathode fluorescent lamp, except for using filament electrodes as electrodes 13. The filaments emit thermoelectrons upon application of a voltage between the two filament electrodes of the hot cathode fluorescent lamp. Mercury is excited by the thermoelectrons and thereby radiates ultraviolet rays. When a hot cathode fluorescent lamp has a very small diameter, mercury radiates a vacuum ultraviolet ray having a wavelength of 185 nm in addition to an ultraviolet ray having a wavelength of 254 nm, as in cold cathode fluorescent lamps. The emission characteristic of a phosphor is therefore significantly affected by the excitation by the vacuum ultraviolet ray. Accordingly, a green-emitting phosphor having the specific composition is advantageously used in hot cathode fluorescent lamps so as to yield both a satisfactory brightness upon VUV excitation and a satisfactory brightness upon excitation by an ultraviolet ray having a wavelength of 254 nm.

External Electrode Fluorescent Lamp (EEFL)

Figure 11:
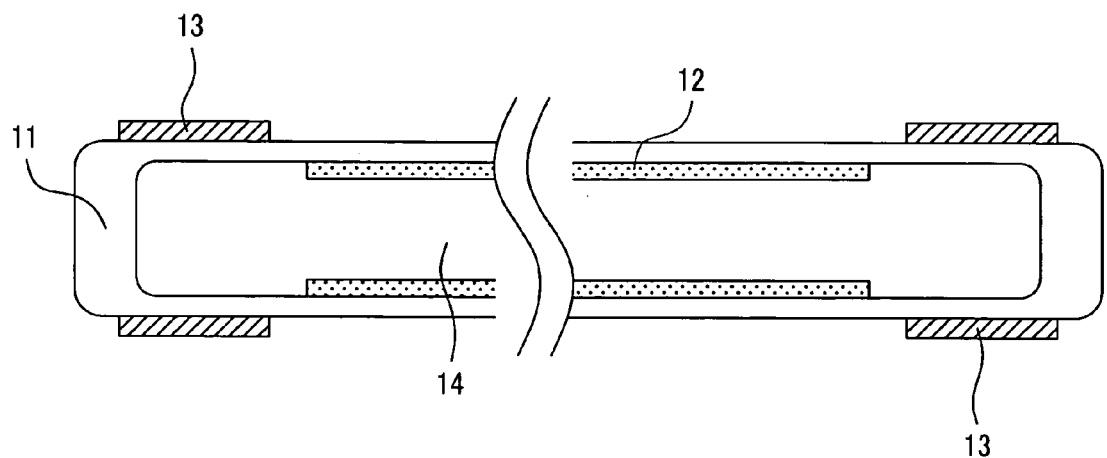
FIG. 11 schematically illustrates a sectional structure of an external electrode fluorescent lamp (EEFL)
Figure 12:
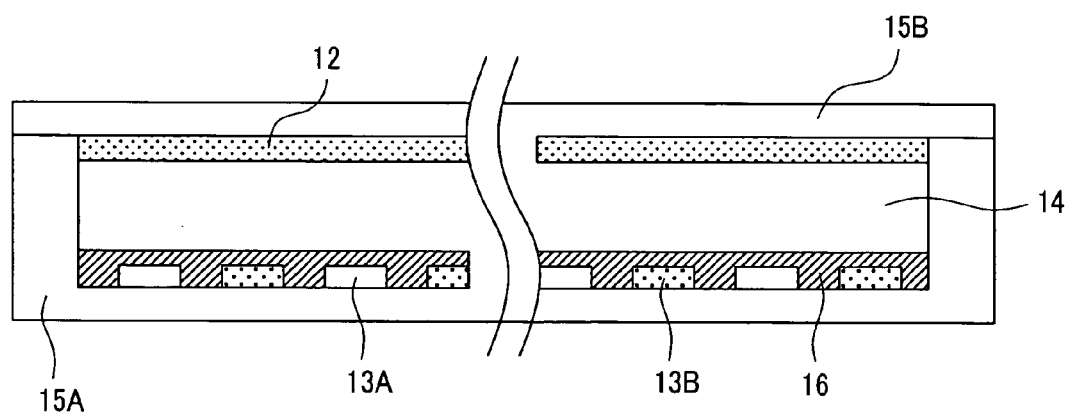
FIG. 12 schematically illustrates a sectional structure of a flat light source.

An external electrode fluorescent lamp has a structure schematically illustrated in FIG. 11. The external electrode fluorescent lamp includes a glass tube 11 and a phosphor 12 arranged in the glass tube 11. The structure is similar to that of a cold cathode fluorescent lamp, except that electrodes 13 are arranged at both ends of and outside the tube. In an external electrode fluorescent lamp, a high voltage is applied to the external electrodes to induce an induction field, and the induction field excites mercury inside the tube. The excited mercury radiates a ultraviolet ray having a wavelength of 254 nm and a vacuum ultraviolet ray having a wavelength of 185 nm which allow the phosphor to emit light.

Heat greater than that in a cold cathode fluorescent lamp is generated in an external electrode fluorescent lamp, because the glass tube directly below the electrodes acts as a dielectric layer, and the dielectric layer invites a larger energy loss. Accordingly, the ends (electrode sections) of the external electrode fluorescent lamp have temperatures higher than those in the ends of the cold cathode fluorescent lamp. This causes a distribution of temperature in an axial direction of tube, and as a result, may cause larger distributions of brightness and chromaticity than in the cold cathode fluorescent lamp. Accordingly, a green-emitting phosphor having the specific composition is advantageously used in external electrode fluorescent lamps so as to yield a high brightness and uniformly distributed brightness and chromaticity.

Flat Light Source

Figure 13:
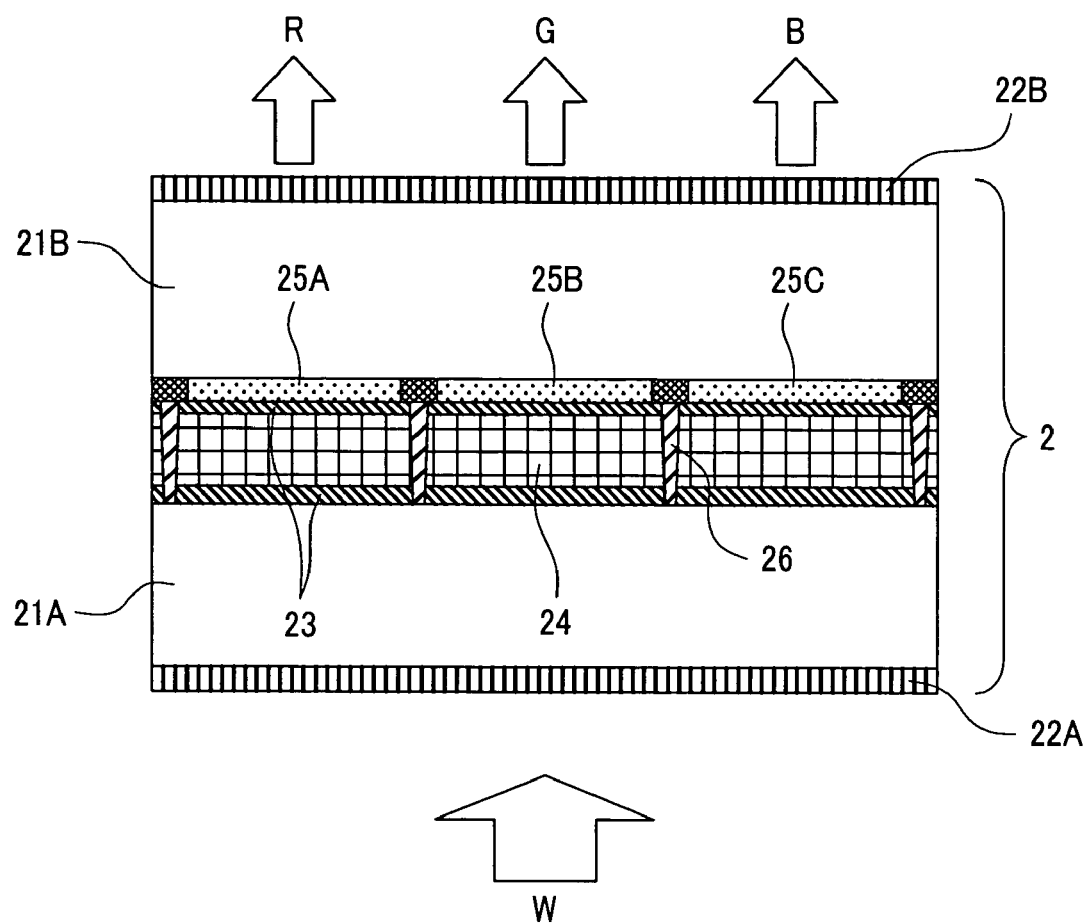
FIG. 13 schematically illustrates a sectional structure of a liquid crystal display panel.

A flat light source generally has a structure schematically illustrated in FIG. 13. Specifically, the flat light source herein includes a phosphor 12, electrodes 13 (13A and 13B), a discharge medium 14, a closed housing 15, and a dielectric 16. The closed housing 15 includes aback glass 15A and a front glass 15B. The phosphor 12 is arranged inside the closed housing 15. The electrodes 13 are arranged on the back glass 15A. The dielectric 16 is arranged over the electrodes 13. The discharge medium 14 is encapsulated in the closed housing 15. These flat light sources may use a variety of discharge media, and some of them use mercury as the discharge medium.

When the discharge medium 14 includes mercury, a green-emitting phosphor having the specific composition is advantageously used, because mercury radiates an ultraviolet ray having a wavelength of 254 nm and a vacuum ultraviolet ray having a wavelength of 185 nm as in cold cathode fluorescent lamps. The phosphor is specifically advantageously used in flat light sources for large-screen liquid crystal display devices. These flat light sources have large principal planes which may often undergo a temperature distribution in the plane.

A green-emitting phosphor having the specific composition can also be advantageously used in other light sources than these in which the phosphor is excited by a vacuum ultraviolet ray having a wavelength of less than 200 nm and an ultraviolet ray having a wavelength of 200 nm or more. This may enable a high brightness and uniformly distributed brightness and chromaticity in the light source. A back light unit including the light source yields liquid crystal display devices which produce high-quality images, are available at low cost, and show a high brightness and uniformly distributed brightness and chromaticity.

A light source including the green-emitting phosphor is effectively used typically in combination with a liquid crystal display panel which operates according to a VA mode. Liquid crystal display panels are classified by the initial alignment of liquid crystal molecules and the operation mode. Current representative examples thereof are those of IPS mode, VA mode, OCB mode, and TN mode. The light source according to an embodiment of the present invention can be applied to all the modes. Among them, the light source is advantageously used in a liquid crystal display panel according to a VA mode so as to improve the disadvantages of the liquid crystal display panel according to a VA mode. The reasons will be described below.

Figure 14A:
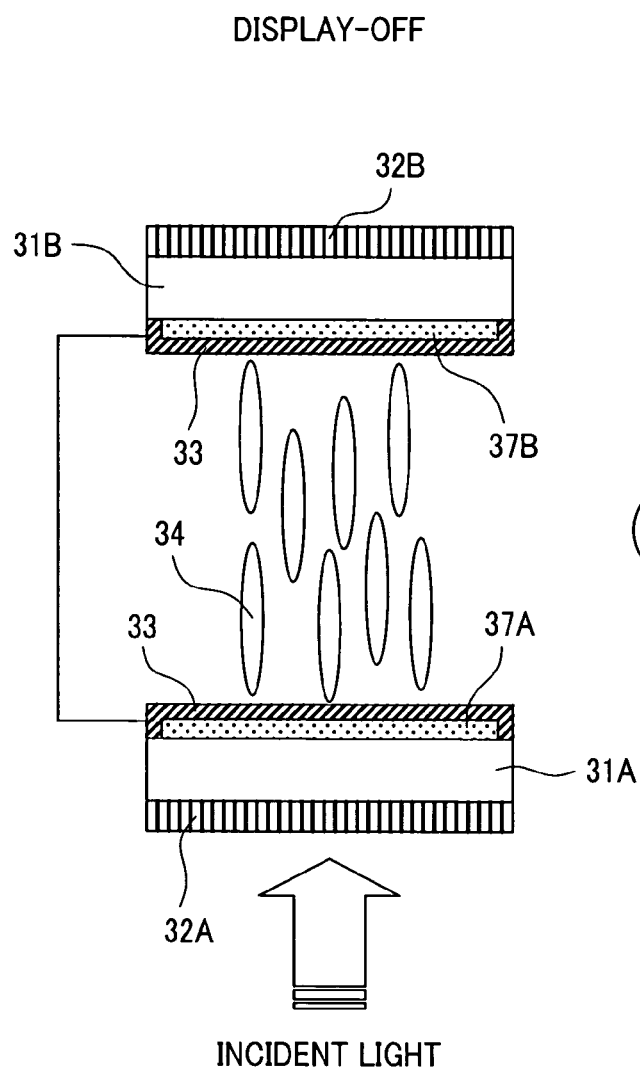
FIGS. 14A and 14B schematically illustrate how a liquid crystal display panel operates according to a vertically aligned (VA) mode.
Figure 14B:
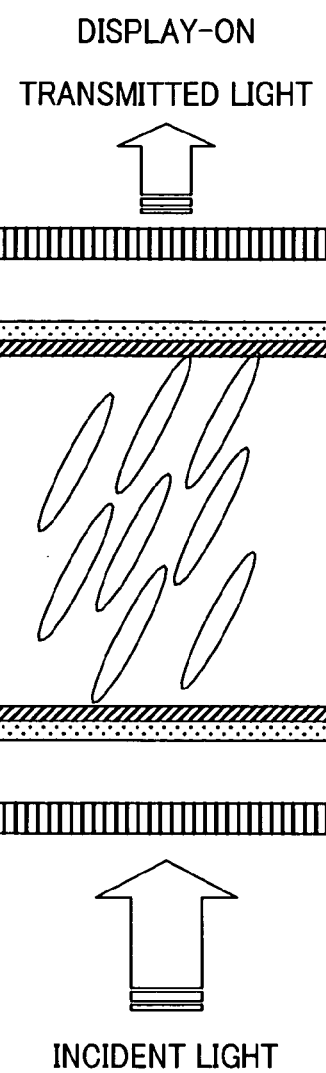

With reference to FIGS. 14A and 14B, a liquid crystal display panel operating according to a VA mode includes a pair of substrates 31 (31A and 31B) facing each other, polarizers 32 (32A and 32B), alignment layers 33, a liquid crystal 34, and electrodes 37 (37A and 37B). The alignment layers 33 are arranged on the inside surfaces of the pair of substrates 31 and are vertically aligned layers. The liquid crystal 34 is arranged between the alignment layers 33. The polarizers 32 are arranged outside of the pair of substrates 31A and 31B. The electrodes 37A and 37B are arranged on the pair of substrates 31A and 31B, respectively. The liquid crystal display panel is so configured to apply a voltage between the electrodes 37A and 37B. When no voltage is applied, the major axes of liquid crystal molecules are aligned in a direction substantially perpendicular to the substrate plane (FIG. 14A). The liquid crystal display device in this stage is display-off, namely, produces no image. Next, a voltage is applied between the electrodes, and an electric field occurs in a direction substantially perpendicular to the substrate plane. This electric field inclines the crystal liquid molecules with respect to the perpendicular direction to the substrate plane. This in turn changes the refractive index of the liquid crystal layer to thereby control the quantity of light from the light source (FIG. 14B). In this stage, the liquid crystal display device is display-on.

Such liquid crystal display panels according to a VA mode have a chromaticity significantly varying depending on the view angle. This disadvantage is typical to the VA mode operation. In particular, the chromaticity largely varies upon display of middle tones. Accordingly, the chromaticity change of a light source and the chromaticity change caused by a liquid crystal display panel significantly affect the image quality of liquid crystal display devices according to a VA mode. In particular, the chromaticity significantly varies at both ends of screens of large-screen liquid crystal display devices according to a VA mode. This is because the chromaticity varies largely in the vicinities of electrodes in a cold cathode fluorescent lamp, and the chromaticity also varies depending on the view angle in a liquid crystal display panel.

Accordingly, a green-emitting phosphor represented by $(La_{1-x-y},Tb_x,Ce_y)PO_4$ having the specific composition is preferably used in liquid crystal display devices according to a VA mode. The green-emitting phosphor contributes to reduce the variation of chromaticity in the cold cathode fluorescent lamp and to reduce the variation of chromaticity depending on the view angle in liquid crystal display devices according to a VA mode. In other words, the green-emitting phosphor contributes to provide high-quality large-screen liquid crystal display devices which operate according to a VA mode.

The present invention will be illustrated in further detail with reference to several examples below, which by no means intend to limit the scope of the present invention. In this connection, a liquid crystal display device according to Comparative Example 1 uses a light source including the green-emitting phosphor $(La_{1-x-y},Tb_x,Ce_y)PO_4$, wherein "x+y" is 0.428 and "y/x" is 2.18, used in related art (hereinafter also briefly referred to as "comparative green phosphor").

EXAMPLE 1

Figure 1B:
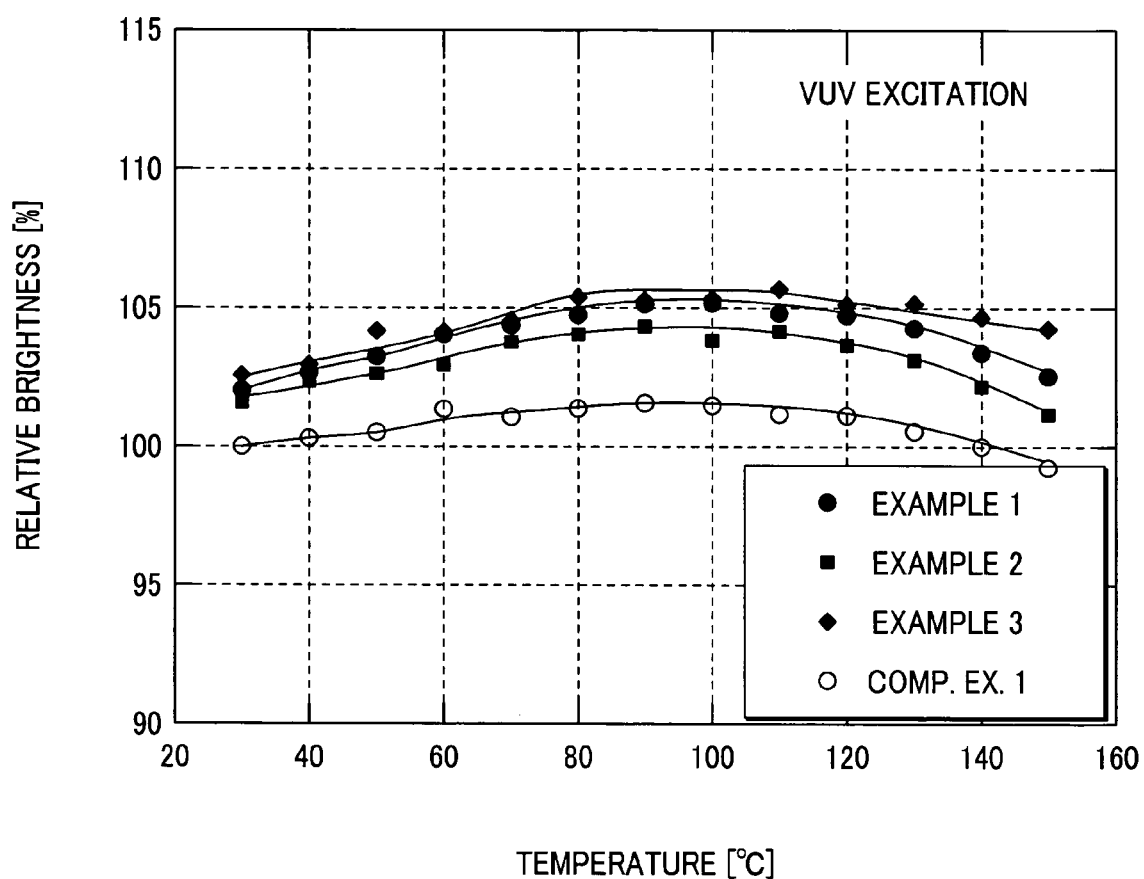
FIG. 1B is a graph showing the temperature characteristics of green-emitting phosphors upon excitation by a vacuum ultraviolet ray.

A green-emitting phosphor $(La_{1-x-y},Tb_x,Ce_y)PO_4$, wherein "x+y" is 0.602 and "y/x" is 1.68, is used herein. This green-emitting phosphor has a higher brightness at room temperature than that of the comparative green-emitting phosphor used in Comparative Example 1. It has a relative brightness of 109% upon excitation at 254 nm and a relative brightness of 102% upon excitation by a vacuum ultraviolet ray (VUV excitation). The temperature characteristics of the phosphor are shown in FIGS. 1A and 1B. FIG. 1A shows the temperature characteristic upon excitation by an ultraviolet ray having a wavelength of 254 nm.

FIG. 1B shows the temperature characteristic upon excitation by a vacuum ultraviolet ray (VUV excitation). FIGS. 1A and 1B demonstrate that the green-emitting phosphor used in Example 1 shows a less varying brightness at such temperatures as in a light source. The phosphor therefore shows satisfactory emission characteristics both upon excitation by an ultraviolet ray having a wavelength of 254 nm and excitation by a vacuum ultraviolet ray. The phosphor is therefore expected to be used in a cold cathode fluorescent lamp so as to yield a high brightness and uniformly distributed brightness and chromaticity.

Figure 8:
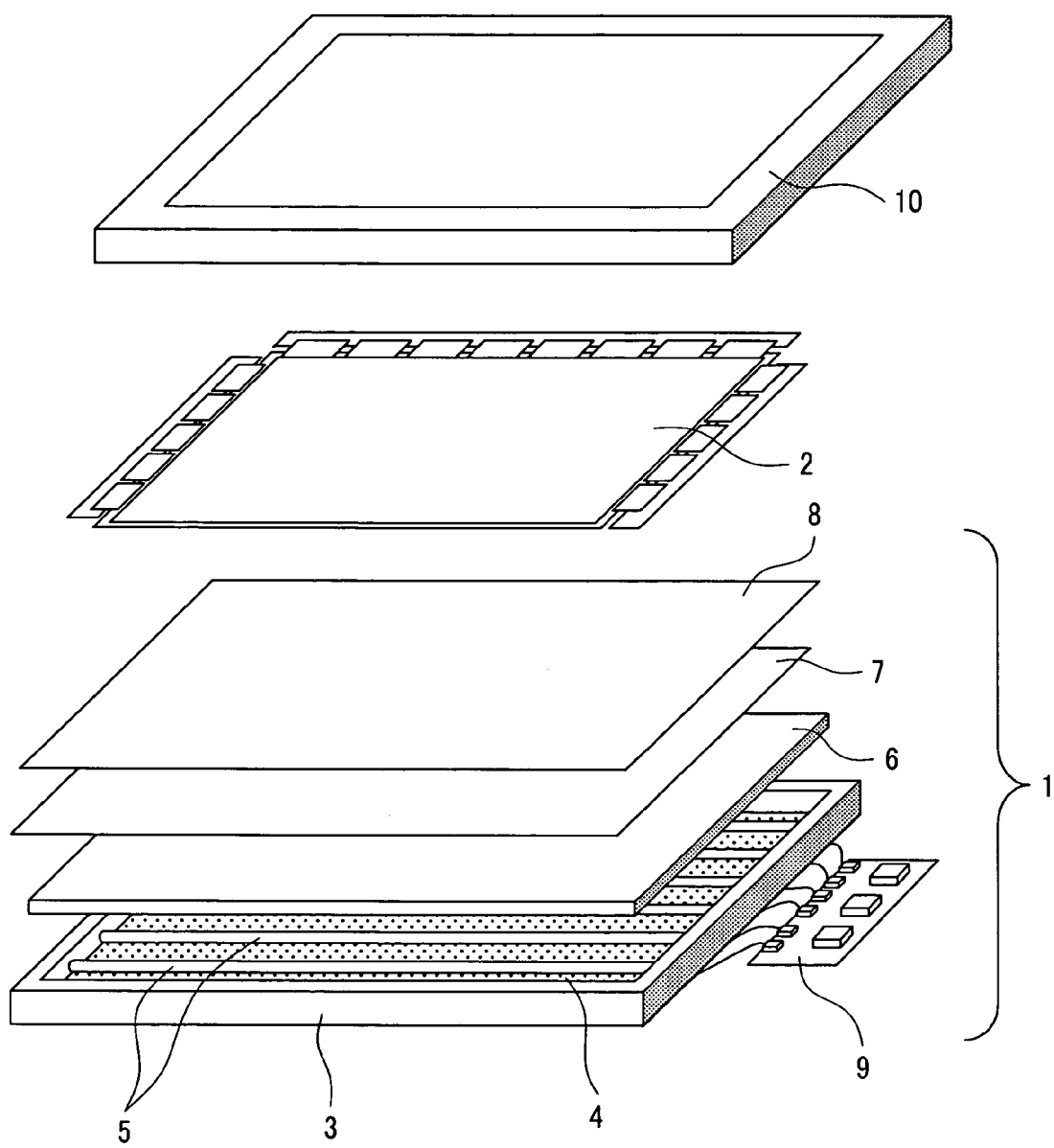
FIG. 8 is an exploded schematic view of a cold cathode fluorescent lamp.

With reference to FIG. 8, a liquid crystal display device used in Example 1 includes a back light unit 1 and a liquid crystal display panel 2. The back light unit 1 includes a white-emitting light source 5, drive circuits (inverters) 9 for driving the light source 5, a casing 3, a reflector 4, a diffuser plate 6, a prism sheet 7, and a reflective polarizer 8.

The cold cathode fluorescent lamp shown in FIG. 9 is used as the white-emitting light source 5 in Example 1. This cold cathode fluorescent lamp has the same configuration as those in related art, except for the composition of a green-emitting phosphor $(La_{1-x-y},Tb_x,Ce_y)PO_4$. The preparation of the cold cathode fluorescent lamp using the green-emitting phosphor having the specific composition, and the preparation of a liquid crystal display device operating according to an IPS mode will be illustrated below.

(1) Preparation of Cold Cathode Fluorescent Lamp

Figure 15:
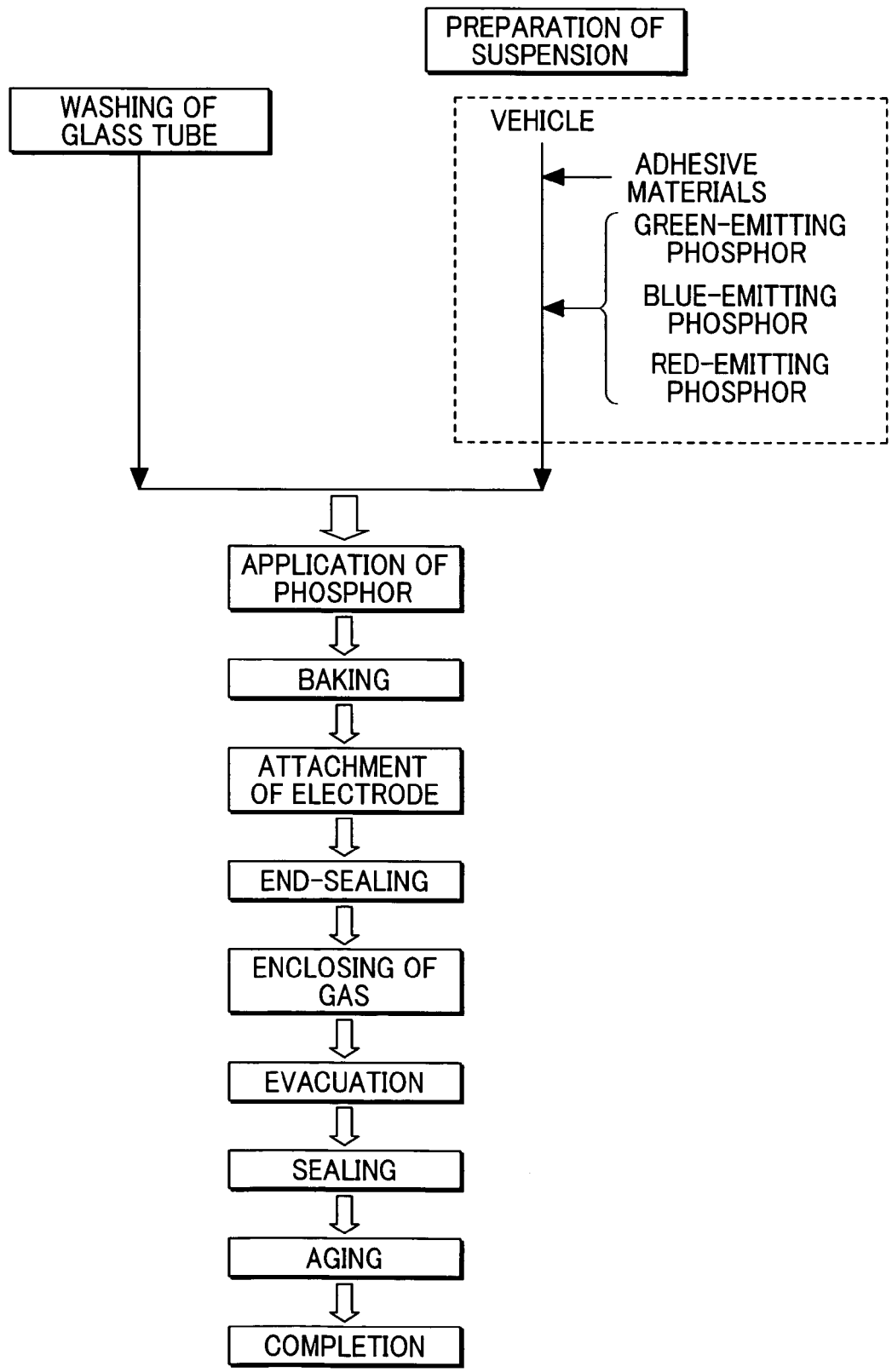
FIG. 15 is a flow chart illustrating the production of a cold cathode fluorescent lamp (CCFL).

A cold cathode fluorescent lamp is prepared by the procedure schematically illustrated in FIG. 15. Initially, a mixture (hereinafter referred to as "suspension") is prepared by mixing an adhesive materials and each of red-, green-, and blue-emitting phosphor materials with nitrocellulose as a vehicle and butyl acetate as an organic solvent. The green-emitting phosphor material includes $(La_{1-x-y},Tb_x,Ce_y)PO_4$, wherein "x+y" is 0.602 and "y/x" is 1.68. The blue-, and red-emitting phosphor materials include $BaMgAl_{10}O_{17}:Eu^{2+}$ and $Y_2O_3:Eu^{3+}$, respectively, as in phosphors used in related art.

The phosphor materials are applied to an inner wall of a glass tube by dipping one end of the glass tube in the above-prepared suspension, evacuating from the other end using a pump, and thereby aspirating the suspension into the glass tube. The glass tube includes a Kovar glass and has an inner diameter of 3 mm. It has been rinsed before hand. The phosphors are fixed to the inner wall of the tube by baking the glass tube. Electrodes are then attached, and one end of the glass tube is sealed. Next, a gas pressure is adjusted by injecting a rare gas such as argon Ar or neon Ne into the glass tube from the other end and thereby evacuating the inside. Mercury is then injected into the glass tube, and the glass tube is sealed. Ultimately, the glass tube is lit for a predetermined time so as to carry out aging.

(2) Assembly of Back Light Unit

The assembly of a back light unit will be illustrated with reference to FIG. 8. Plural cold cathode fluorescent lamps 5 are arranged in a metal casing 3. A direct back light unit is employed in liquid crystal display devices, of which high brightness is required, as in liquid crystal display television sets. In the direct back light unit, plural cold cathode fluorescent lamps are arranged two-dimensionally below a screen (display).

A reflector 4 is arranged between the metal casing 3 and the cold cathode fluorescent lamps 5. The reflector 4 serves to utilize light emitted toward the metal casing 3 efficiently. A diffuser plate 6 is arranged directly above the cold cathode fluorescent lamps 5. The diffuser plate 6 is configured to reduce in-plane distribution of the brightness of the liquid crystal display device. A prism sheet 7 and a reflective polarizer 8 are arranged and configured as to further improve the brightness of the liquid crystal display device. Inverters 9 are connected to the cold cathode fluorescent lamps 5. The inverters 9 are configured to drive and control On-Off of the cold cathode fluorescent lamps 5. These components are synthetically referred to as "back light unit 1".

(3) Preparation of Liquid Crystal Display Panel

A liquid crystal display panel 2 is arranged directly above the back light unit 1. The liquid crystal display panel 2 includes color filters that are configured to control the transition of light from the back light unit (white light source, cold cathode fluorescent lamp) and split the light into red, green, and blue components on a pixel basis.

The liquid crystal display panel 2 has a sectional structure schematically illustrated in FIG. 13. Substrates 21 generally each include a glass substrate having a thickness of about 0.5 mm. Electrodes (not shown) and thin film transistors (TFTs) are arranged on a pixel basis on one substrate 21A. The TFTs are configured to apply a voltage to these electrodes. Color filters 25 (red filter 25A, green filter 25B, and blue filter 25C) are arranged on a pixel basis on the other substrate 21B. Alignment layers 23 are arranged on surfaces of the pair of substrates 21A and 21B, respectively. The alignment layers 23 are configured to align liquid crystal molecules. Next, a liquid crystal 24 is arranged between the pair of substrates 21A and 21B. Polarizers 22 (22A and 22B) are arranged outside the pair of substrates 21A and 21B, respectively.

Finally, the back light unit 1 and the liquid crystal display panel 2 are integrated and are covered with a casing 10. Thus, a liquid crystal display device is prepared.

According to this example, there is provided a cold cathode fluorescent lamp having both high brightness and uniformly distributed brightness and chromaticity. By using this as a light source, a high-quality liquid crystal display device with good image quality is obtained at low cost.

EXAMPLE 2

A liquid crystal display device is prepared by the procedure of Example 1, except for using a green-emitting phosphor $(La_{1-x-y},Tb_x,Ce_y)PO_4$, wherein "x+y" is 0.551 and "y/x" is 1.68, as the green-emitting phosphor. In other words, the green-emitting phosphor used herein differs from that used in Example 1 only by the composition.

The phosphor used in Example 2 has a higher brightness than that in the green-emitting phosphor used in Comparative Example 1 (comparative green-emitting phosphor). It has a relative brightness of 107% upon excitation at 254 nm and of 102% upon VUV excitation.

The temperature characteristics of this phosphor are shown in FIGS. 1A and 1B. FIGS. 1A and 1B demonstrate that the green-emitting phosphor used in Example 2 shows a less varying brightness at such temperatures as in a light source. The phosphor therefore shows satisfactory emission characteristics both upon excitation by an ultraviolet ray having a wavelength of 254 nm and excitation by a vacuum ultraviolet ray. The phosphor is therefore expected to be used in a cold cathode fluorescent lamp so as to yield a high brightness and uniformly distributed brightness and chromaticity.

According to this example, there is provided a cold cathode fluorescent lamp having both high brightness and uniformly distributed brightness and chromaticity. By using this as a light source, a high-quality liquid crystal display device with good image quality is obtained at low cost.

EXAMPLE 3

A liquid crystal display device is prepared by the procedure of Example 1, except for using a green-emitting phosphor $(La_{1-x-y},Tb_x,Ce_y)PO_4$, wherein "x+y" is 0.505 and "y/x" is 1.70, as the green-emitting phosphor. In other words, the green-emitting phosphor used herein differs from that used in Example 1 only by the composition.

The phosphor used in Example 3 has a higher brightness than that in the green-emitting phosphor used in Comparative Example 1 (comparative green-emitting phosphor). It has a relative brightness of 105% upon excitation at 254 nm and of 103% upon VUV excitation. The temperature characteristics of this phosphor are shown in FIGS. 1A and 1B. FIGS. 1A and 1B demonstrate that the green-emitting phosphor used in Example 3 shows a less varying brightness at such temperatures as in a light source. The phosphor therefore shows satisfactory emission characteristics both upon excitation by an ultraviolet ray having a wavelength of 254 nm and excitation by a vacuum ultraviolet ray. The phosphor is therefore expected to be used in a cold cathode fluorescent lamp so as to yield a high brightness and uniformly distributed brightness and chromaticity.

According to this example, there is provided a cold cathode fluorescent lamp having both high brightness and uniformly distributed brightness and chromaticity. By using this as a light source, a high-quality liquid crystal display device with good image quality is obtained at low cost.

EXAMPLE 4

A liquid crystal display device is prepared by the procedure of Example 1, except for using an external electrode fluorescent lamp (EEFL) shown in FIG. 11 as the light source. The phosphors used in the external electrode fluorescent lamp are the same as in Example 1.

Such an external electrode fluorescent lamp is prepared according to a similar procedure to that of cold cathode fluorescent lamps, except for the preparation of electrodes. In the preparation of an external electrode fluorescent lamp, after applying phosphors to a glass tube, one end of the glass tube is sealed, evacuation is carried out, mercury as a discharge medium is then introduced, and the other end of the glass tube is sealed. Next, flexible electrodes, such as copper tapes, are arranged outside the glass tube.

Ballast capacitors are not necessary in the external electrode fluorescent lamp, because the glass tube itself acts as a capacitor. Accordingly, the plural lamps 5 can be driven and controlled by one inverter 9. This reduces the number of inverters as compared with a cold cathode fluorescent lamp, which in turn may reduce the cost of external electrode fluorescent lamp.

However, an external electrode fluorescent lamp generates heat greater than a cold cathode fluorescent lamp, because the glass tube itself acts as a dielectric. Electrode sections in the external electrode fluorescent lamp undergo further elevated temperatures. Accordingly, the external electrode fluorescent lamp is more susceptible to temperature distribution (temperature unevenness) and more susceptible to distributions of brightness and chromaticity caused by the temperature characteristic of a phosphor. Consequently, the use of the specific green-emitting phosphor may allow the external electrode fluorescent lamp to have both high brightness and uniformized distributions of brightness and chromaticity.

The other components such as a liquid crystal display panel 2 are the same as in Example 1. According to this example, there is provided an external electrode fluorescent lamp having both high brightness and uniformly distributed brightness and chromaticity. By using this as a light source, a high-quality liquid crystal display device with good image quality is obtained at low cost.

EXAMPLE 5

A liquid crystal display device is prepared by the procedure of Example 1, except for using a liquid crystal display panel 2 having a different configuration. Specifically, a liquid crystal display panel operating according to a VA mode is used in Example 5, instead of the liquid crystal display panel operating according to an IPS mode.

Liquid crystal display devices according to a VA mode have a chromaticity largely varying depending on the view angle. Specifically, when the screen is seen from the front, the chromaticity largely varies at both ends of the screen. However, the liquid crystal display device using the green-emitting phosphor can reduce the variations of brightness and chromaticity at both ends of the screen, as compared with equivalents in related art. This is because the green-emitting phosphor serves to suppress the variations of brightness and chromaticity in the cold cathode fluorescent lamp. In particular, variation of chromaticity upon display of halftone images can be suppressed.

COMPARATIVE EXAMPLE 1

A liquid crystal display device is prepared by the procedure of Example 1, except for using a green-emitting phosphor $(La_{1-x-y},Tb_x,Ce_y)PO_4$, wherein "x+y" is 0.428 and "y/x" is 2.18, as the green-emitting phosphor. This green-emitting phosphor is used in liquid crystal display devices in related art.

The brightness of the green-emitting phosphor used herein is taken as a standard of the brightness. The green-emitting phosphor has a relative brightness at room temperature of 100% both upon excitation at 254 nm and VUV excitation. The temperature characteristics of this green-emitting phosphor are shown in FIGS. 1A and 1B. FIGS. 1A and 1B demonstrate that the green-emitting phosphor shows a large variation of brightness at such temperatures as in a light source especially upon excitation by ultraviolet ray having a wavelength of 254 nm.

It should be understood by those skilled in the art that various modifications, combinations, sub-combinations and alternations may occur depending on design requirements and other factors insofar as they are within the scope of the appended claims or the equivalents thereof.

What is claimed is:

1. A liquid crystal display device comprising:
   a light source including
      a blue-emitting phosphor configured to emit blue light,
      a green-emitting phosphor configured to emit green light, and
      a red-emitting phosphor configured to emit red light; and
   a liquid crystal display panel including
      color filters configured to control the transmittance of light from the light source and to transmit one of blue, green, and red light on a pixel basis,
   wherein the green-emitting phosphor is represented by a compositional formula of $(La_{1-x-y},Tb_x,Ce_y)PO_4$, wherein "x" and "y" are compositional ratios satisfying both the following conditions (1) and (2):

$$0.500 < (x+y) < 0.700 \quad (1)$$

$$1.20 < (y/x) < 2.00 \quad (2).$$

2. The liquid crystal display device according to claim 1, wherein the light source comprises:
   a closed housing including the blue-emitting phosphor, the green-emitting phosphor, and the red-emitting phosphor;
   a discharge medium enclosed in the closed housing; and
   electrodes configured to apply a voltage to the discharge medium,
   wherein the discharge medium is configured to radiate ultraviolet rays having different wavelengths, and
   wherein the phosphors are configured to be excited and emit light upon irradiation with the ultraviolet rays having different wavelengths.

3. The liquid crystal display device according to claim 2, wherein the ultraviolet rays having different wavelengths include at least one vacuum ultraviolet ray having a wavelength of less than 200 nm and at least one ultraviolet ray having a wavelength of 200 nm or more.

4. The liquid crystal display device according to claim 2, wherein the discharge medium mainly comprises mercury (Hg), and
   wherein the ultraviolet rays having different wavelengths include a vacuum ultraviolet ray having a wavelength of 185 nm and an ultraviolet ray having a wavelength of 254 nm.

5. The liquid crystal display device according to claim 4, wherein the intensity ratio $I_{185}/I_{254}$ of the vacuum ultraviolet ray having a wavelength of 185 nm to the ultraviolet ray having a wavelength of 254 nm is 0.20 or more in the closed housing.

6. The liquid crystal display device according to claim 2, wherein the closed housing comprises a glass tube and wherein the glass tube has an inner diameter of 5 mm or less.

7. The liquid crystal display device according to claim 6, wherein the electrodes are arranged at both ends of and inside the glass tube.

8. The liquid crystal display device according to claim 6, wherein the electrodes are arranged at both ends of and outside the glass tube.

9. The liquid crystal display device according to claim 1, wherein the light source comprises at least one cold cathode fluorescent lamp having an inner diameter of 5 mm or less, and wherein the cold cathode fluorescent lamp includes a discharge medium mainly containing mercury (Hg).

10. The liquid crystal display device according to claim 1, wherein the green-emitting phosphor comprises particles having a median particle diameter $d_{50}$ within a range of 3.0 μm to 6.0 μm.

11. The liquid crystal display device according to claim 1, wherein the liquid crystal display panel comprises:
    a pair of optically transparent substrates facing each other;
    alignment layers arranged on or above inner surfaces of the pair of substrates;
    a liquid crystal layer arranged between the alignment layers; and
    polarizers arranged outside the pair of substrates,
    wherein the alignment layers are vertically aligned layers, and
    wherein liquid crystal molecules constituting the liquid crystal are configured to align substantially vertical to a substrate plane upon application of no voltage and to align in a slanting direction to the substrate plane so as to control a light transmittance.

12. A liquid crystal display device comprising:
    a light source including
       a blue-emitting phosphor configured to emit blue light,
       a green-emitting phosphor configured to emit green light, and
       a red-emitting phosphor configured to emit red light; and
    a liquid crystal display panel including
       color filters configured to control the transmittance of light from the light source on a pixel basis and to transmit one of blue, green, and red light on a pixel basis,
    wherein the green-emitting phosphor is represented by a compositional formula of $(La_{1-x-y},Tb_x,Ce_y)PO_4$, wherein "x" and "y" are compositional ratios satisfying both the following conditions (3) and (4):

$$0.500 < (x+y) < 0.650 \quad (3)$$

$$1.50 < (y/x) < 1.70 \quad (4).$$

13. The liquid crystal display device according to claim 12, wherein the light source comprises:
    a closed housing including the blue-emitting phosphor, the green-emitting phosphor, and the red-emitting phosphor;
    a discharge medium enclosed in the closed housing; and
    electrodes configured to apply a voltage to the discharge medium, wherein the discharge medium is configured to radiate ultraviolet rays having different wavelengths, and wherein the phosphors are configured to be excited and emit light upon irradiation with the ultraviolet rays having different wavelengths.

14. The liquid crystal display device according to claim 13, wherein the ultraviolet rays having different wavelengths include at least one vacuum ultraviolet ray having a wavelength of less than 200 nm and at least one ultraviolet ray having a wavelength of 200 nm or more.

15. The liquid crystal display device according to claim 13, wherein the discharge medium mainly comprises mercury (Hg), and wherein the ultraviolet rays having different wavelengths include a vacuum ultraviolet ray having a wavelength of 185 nm and an ultraviolet ray having a wavelength of 254 nm.

16. The liquid crystal display device according to claim 15, wherein the intensity ratio $I_{185}/I_{254}$ of the vacuum ultraviolet ray having a wavelength of 185 nm to the ultraviolet ray having a wavelength of 254 nm is 0.20 or more in the closed housing.

17. The liquid crystal display device according to claim 13, wherein the closed housing comprises a glass tube, and wherein the glass tube has an inner diameter of 5 mm or less.

18. The liquid crystal display device according to claim 17, wherein the electrodes are arranged at both ends of and inside the glass tube.

19. The liquid crystal display device according to claim 17, wherein the electrodes are arranged at both ends of and outside the glass tube.

20. The liquid crystal display device according to claim 12, wherein the light source comprises at least one cold cathode fluorescent lamp having an inner diameter of 5 mm or less, and wherein the cold cathode fluorescent lamp includes a discharge medium mainly containing mercury (Hg).

21. The liquid crystal display device according to claim 12, wherein the green-emitting phosphor comprises particles having a median particle diameter $d_{50}$ within a range of 3.0 μm to 6.0 μm.

22. The liquid crystal display device according to claim 12, wherein the liquid crystal display panel comprises:

a pair of optically transparent substrates facing each other;

alignment layers arranged on or above inner surfaces of the pair of substrates;

a liquid crystal layer arranged between the alignment layers; and polarizers arranged outside the pair of substrates, wherein the alignment layers are vertically aligned layers, and wherein liquid crystal molecules constituting the liquid crystal are configured to align substantially vertical to a substrate plane upon application of no voltage and to align in a slanting direction to the substrate plane so as to control a light transmittance.

23. A liquid crystal display device comprising:

a light source including
  a blue-emitting phosphor configured to emit blue light,
  a green-emitting phosphor configured to emit green light, and
  a red-emitting phosphor configured to emit red light; and a liquid crystal display panel including
  color filters configured to control the transmittance of light from the light source and to transmit one of blue, green, and red light on a pixel basis, wherein the green-emitting phosphor is represented by a compositional formula of $(La_{1-x-y},Tb_x,Ce_y)PO_4$, wherein "x" and "y" are compositional ratios satisfying both the following conditions (3) and (4):

$$0.500 < (x+y) < 0.650 \tag{3}$$

$$1.50 < (y/x) < 1.70 \tag{4},$$

wherein the liquid crystal display panel includes
  a pair of optically transparent substrates facing each other;
  alignment layers arranged on or above inner surfaces of the pair of substrates;
  a liquid crystal layer arranged between the alignment layers; and
  polarizers arranged outside the pair of substrates, and wherein the liquid crystal display panel is configured to operate according to an in-plane switching (IPS) mode.

* * * * *